US010174894B2

(12) United States Patent
Sugiyama

(10) Patent No.: US 10,174,894 B2
(45) Date of Patent: Jan. 8, 2019

(54) VEHICLE HEADLAMP UNIT AND VEHICLE HEADLAMP SYSTEM

(71) Applicant: Stanley Electric Co., Ltd., Tokyo (JP)

(72) Inventor: Takashi Sugiyama, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 64 days.

(21) Appl. No.: 14/959,358

(22) Filed: Dec. 4, 2015

(65) Prior Publication Data

US 2016/0169469 A1 Jun. 16, 2016

(30) Foreign Application Priority Data

Dec. 11, 2014 (JP) ................................ 2014-250699
Feb. 13, 2015 (JP) ................................ 2015-026561

(51) Int. Cl.

| | |
|---|---|
| ***B60Q 1/00*** | (2006.01) |
| ***F21S 41/135*** | (2018.01) |
| ***F21V 9/14*** | (2006.01) |
| ***F21S 41/147*** | (2018.01) |
| ***F21S 41/20*** | (2018.01) |
| ***F21S 41/25*** | (2018.01) |

(Continued)

(52) U.S. Cl.

CPC ........... *F21S 41/135* (2018.01); *F21S 41/147* (2018.01); *F21S 41/16* (2018.01); *F21S 41/25* (2018.01);

(Continued)

(58) Field of Classification Search

CPC .. F21S 48/114; F21S 48/1159; F21S 48/1225; F21S 48/125; F21S 48/1731; F21S 48/1747; F21V 9/14; F21V 9/16

(Continued)

(56) References Cited

U.S. PATENT DOCUMENTS 5,535,054 A 7/1996 Shibuya
5,596,451 A * 1/1997 Handschy .......... G02B 27/0172 359/633

(Continued)

FOREIGN PATENT DOCUMENTS

DE 10 2013 200 925 A1 7/2014
JP 7-108873 A 4/1995

(Continued)

OTHER PUBLICATIONS

The extended European search report for the related European Patent Application No. 15198301.2 dated Apr. 26, 2016.

(Continued)

*Primary Examiner* — Tsion Tumebo

(74) *Attorney, Agent, or Firm* — Kenealy Vaidya LLP

(57) ABSTRACT

A vehicle headlamp unit for irradiating light in front of the vehicle with a high contrast ratio and is capable of sufficiently cutting off the illumination light is provided. The unit includes a light source, a parallel optical system that produces parallel light, a polarizing beam splitter that splits light emitted from the parallel optical system into two polarized beams having polarization directions orthogonal to each other, a reflection-type liquid crystal element capable of switching between a first state where the light emitted from a first surface of the polarizing beam splitter is reflected without rotation of the polarization direction, and a second state where the light is reflected with rotation of the polarization direction, in each predetermined section, and a projection optical system that projects light, reflected by the reflection-type liquid crystal element and passed through the polarizing beam splitter once again, in front of the vehicle.

8 Claims, 17 Drawing Sheets

(51) Int. Cl.

| | |
|---|---|
| ***F21S 41/64*** | (2018.01) |
| ***F21S 41/663*** | (2018.01) |
| ***F21S 41/16*** | (2018.01) |
| ***F21V 9/30*** | (2018.01) |

(52) U.S. Cl.
CPC ........... *F21S 41/285* (2018.01); *F21S 41/645* (2018.01); *F21S 41/663* (2018.01); *F21V 9/14* (2013.01); *F21V 9/30* (2018.02)

(58) Field of Classification Search
USPC ............................................................ 362/19
See application file for complete search history.

(56) References Cited

U.S. PATENT DOCUMENTS

| | | | | |
|---|---|---|---|---|
| 5,808,800 A * | 9/1998 | Handschy | G02B 27/1033 349/11 |
| 5,900,976 A * | 5/1999 | Handschy | G02B 5/3033 349/96 |
| 6,078,363 A | 6/2000 | Masuda et al. | |
| 6,328,447 B1 | 12/2001 | Yamazaki et al. | |
| 2003/0058411 A1 | 3/2003 | Katsumata et al. | |
| 2009/0279316 A1 | 11/2009 | Hikmet et al. | |
| 2010/0103084 A1* | 4/2010 | Oto | G02B 5/3083 345/88 |
| 2012/0008098 A1 | 1/2012 | Akiyama | |

FOREIGN PATENT DOCUMENTS

| | | |
|---|---|---|
| JP | 2007-079401 A | 3/2007 |
| JP | 2009-534790 A | 9/2009 |
| JP | 2012-018208 A | 1/2012 |

OTHER PUBLICATIONS

Japanese Office Action for the related Japanese Patent Application No. 2014-250699 dated Aug. 3, 2018.

* cited by examiner

VEHICLE HEADLAMP UNIT AND VEHICLE HEADLAMP SYSTEM

BACKGROUND OF THE INVENTION

Field of the Invention

The present invention relates to a vehicle headlamp unit for selectively irradiating light in accordance with a position of a forward vehicle or the like, and a vehicle headlamp system comprising the vehicle headlamp unit.

Description of the Background Art

Conventionally, there have been known vehicle headlamp systems that set an irradiation range and a non-irradiation range of light from a headlamp unit of a vehicle in accordance with a position of an oncoming vehicle or a preceding vehicle that exists in front of the vehicle (hereinafter simply referred to as "forward vehicle").

A precedent example related to such a vehicle headlamp system is disclosed in Japanese Unexamined Patent Application Publication No. 07-108873 (hereinafter referred to as "Patent document 1"), for example. According to this type of vehicle headlamp system, a camera is installed in a predetermined position of the vehicle (in a center upper area of a front windshield, for example), and a position of a vehicle body, a tail lamp, or a headlamp of a forward vehicle captured by the camera is detected by image processing. Then, light distribution control is performed so that light from the headlamp units of its own vehicle is not irradiated in a section of the detected forward vehicle.

Further, as a precedent example of a vehicle headlamp that can be applied to light distribution control such as described above, a vehicle headlamp that utilizes a liquid crystal element is disclosed in Japanese Translation of PCT International Application Publication No. JP-T-2009-534790 (hereinafter referred to as "Patent document 2"), for example. The lamp unit for a vehicle adaptive front lighting system disclosed in this document is a lamp unit that includes a liquid crystal element configured to receive light emitted by a light source, wherein the liquid crystal element has, when light passes through the liquid crystal element, a first state configured so that incident light is transmitted through without substantial refraction, and a second state configured so that the incident light is refracted, and the liquid crystal element is controlled based on a signal received from the adaptive front lighting system.

However, in the precedent example according to Patent Document 2, while the vehicle headlamp uses an element that utilizes refraction and scattering as the liquid crystal element, the liquid crystal element has a low light-dark ratio (contrast ratio) compared to a liquid crystal element for a display (liquid crystal display element) used in a liquid crystal television or the like, and is thus not always capable of sufficiently cutting off the illumination light when utilized for light distribution control of a vehicle headlamp, leaving room for improvement.

It is therefore an object of specific aspects according to the present invention to provide a vehicle headlamp unit and the like that have a high contrast ratio of light and dark light, and are capable of sufficiently cutting off the illumination light.

SUMMARY OF THE INVENTION

A vehicle headlamp unit of a first aspect according to the present invention is a vehicle headlamp unit for selectively irradiating light in front of a vehicle, including: (a) a light source, (b) a parallel optical system that turns light from the light source into parallel light, (c) a polarizing beam splitter that splits light emitted from the parallel optical system into two polarized beams having polarization directions orthogonal to each other, (d) a reflection-type liquid crystal element capable of switching between a first state in which the light emitted from a first surface of the polarizing beam splitter is reflected without rotation of the polarization direction, and a second state in which the light is reflected with rotation of the polarization direction, in each predetermined section, and (e) a projection optical system that projects light, which has been reflected by the reflection-type liquid crystal element and passed through the polarizing beam splitter once again, in front of the vehicle.

A vehicle headlamp unit of a second aspect according to the present invention is a vehicle headlamp unit for selectively irradiating light in front of a vehicle, including: (a) a light source that emits light of a first wavelength, which is a single wavelength, (b) a parallel optical system that turns light from the light source into parallel light, (c) a polarizing beam splitter that splits light emitted from the parallel optical system into two polarized beams having polarization directions orthogonal to each other, (d) a reflection-type liquid crystal element capable of switching between a first state in which the light emitted from a first surface of the polarizing beam splitter is reflected without rotation of the polarization direction, and a second state in which the light is reflected with rotation of the polarization direction, in each predetermined section, (e) a fluorescent substance that emits fluorescent light that is excited by light that was reflected by the reflection-type liquid crystal element and passed through the polarizing beam splitter once again, and has a second wavelength that is different from the first wavelength, and (f) a projection optical system that projects mixed-color light of the fluorescent light from the fluorescent substance as well as light that has passed through the fluorescent substance, in front of the vehicle.

A vehicle headlamp unit of a third aspect according to the present invention is a vehicle headlamp unit for selectively irradiating light in front of a vehicle, including: (a) a light source, (b) a parallel optical system that turns light from the light source into parallel light, (c) a polarizing beam splitter that splits light emitted from the parallel optical system into two polarized beams having polarization directions orthogonal to each other, (d) a first reflection-type liquid crystal element capable of switching between a first state in which the light emitted from a first surface of the polarizing beam splitter is reflected without rotation of the polarization direction, and a second state in which the light is reflected with rotation of the polarization direction, in each predetermined section, (e) a second reflection-type liquid crystal element capable of switching between a first state in which the light emitted from a second surface of the polarizing beam splitter is reflected without rotation of the polarization direction, and a second state in which the light is reflected with rotation of the polarization direction, in each predetermined section, and (f) a projection optical system that projects light, which has been reflected by the first and the second reflection-type liquid crystal element respectively and passed through the polarizing beam splitter once again, in front of the vehicle.

A vehicle headlamp unit of a fourth aspect according to the present invention is a vehicle headlamp unit for selectively irradiating light in front of a vehicle, including: (a) a light source that emits light of a first wavelength, which is a single wavelength, (b) a parallel optical system that turns light from the light source into parallel light, (c) a polarizing beam splitter that splits light emitted from the parallel optical system into two polarized beams having polarization directions orthogonal to each other, (d) a first reflection-type liquid crystal element capable of switching between a first state in which the light emitted from a first surface of the polarizing beam splitter is reflected without rotation of the polarization direction, and a second state in which the light is reflected with rotation of the polarization direction, in each predetermined section, (e) a second reflection-type liquid crystal element capable of switching between a first state in which the light emitted from a second surface of the polarizing beam splitter is reflected without rotation of the polarization direction, and a second state in which the light is reflected with rotation of the polarization direction, in each predetermined section, (f) a fluorescent substance that emits fluorescent light that is excited by light that was reflected by the first and the second reflection-type liquid crystal element respectively and passed through the polarizing beam splitter once again, and has a second wavelength that is different from the first wavelength, and (g) a projection optical system that projects mixed-color light of the fluorescent light from the fluorescent substance as well as light that has passed through the fluorescent substance, in front of the vehicle.

According to any one of the foregoing configuration, it is possible to achieve a vehicle lamp unit that have a high contrast ratio of light and dark light and are capable of sufficiently cutting off the illumination light. And according to the configuration of the third and the fourth aspect, in addition to the forestated effect, it is possible to further increase light usage efficiency.

In the vehicle headlamp unit of the first aspect or the second aspect described above, preferably the light source produces polarized beams.

In the vehicle headlamp unit of the third aspect or the fourth aspect described above, preferably the light-dark patterns of the reflected light from the first reflection-type liquid crystal element and the second reflection-type liquid crystal element are the same, and these same light-dark patterns are combined in the polarizing beam splitter so as to overlap each other.

In the vehicle headlamp unit of the third aspect or the fourth aspect described above, preferably the light-dark patterns of the reflected light from the first reflection-type liquid crystal element and the second reflection-type liquid crystal element are different, and these different light-dark patterns are combined in the polarizing beam splitter so as to overlap each other.

DESCRIPTION OF THE PREFERRED EMBODIMENTS

The following describes embodiments of the present invention with reference to drawings.

Embodiment 1

Figure 1:
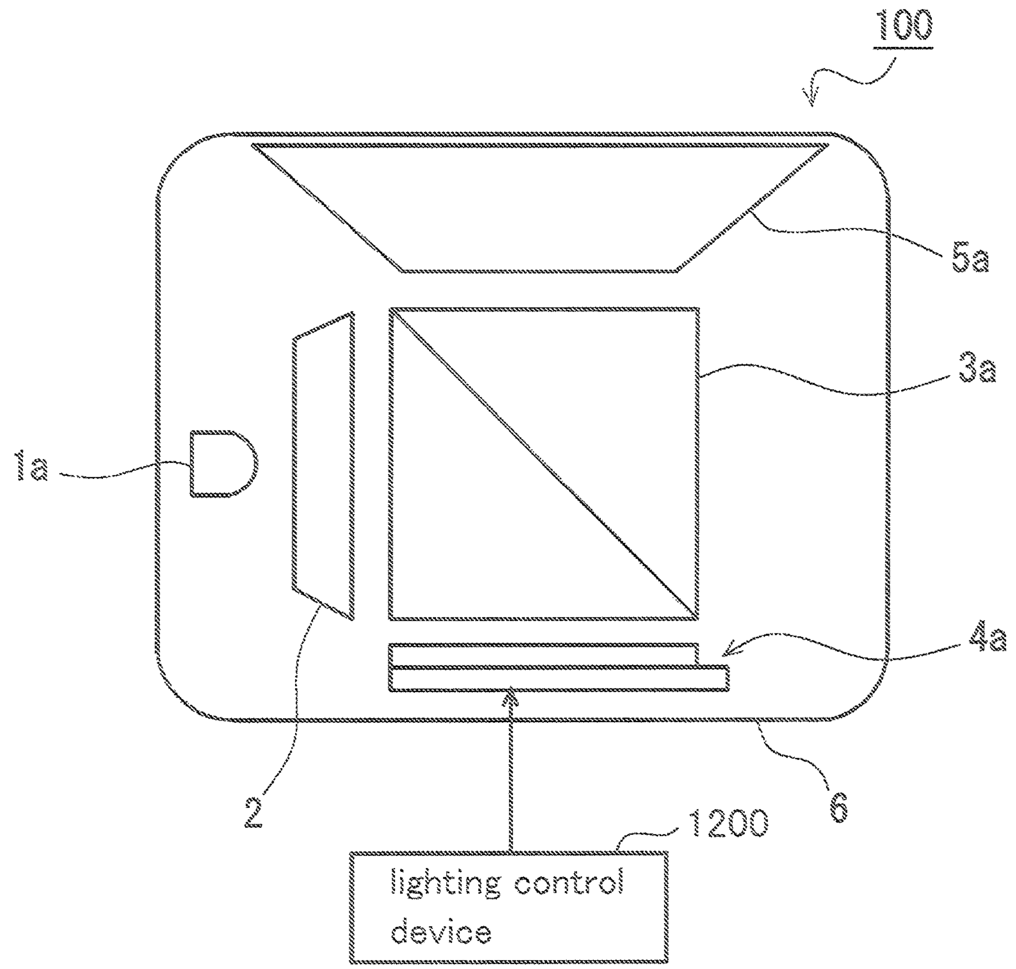
FIG. 1 is a schematic drawing for describing a vehicle lamp unit of embodiment 1.

FIG. 1 is a schematic drawing for describing a vehicle lamp unit (vehicle headlamp unit) of embodiment 1. A vehicle lamp unit 100 of embodiment 1 is configured to include a light source 1*a*, a parallel optical system 2, a polarizing beam splitter 3*a*, a reflection-type liquid crystal element 4*a*, a projection optical system 5*a*, and a lamp unit housing 6 that houses these.

This vehicle lamp unit 100 is controlled by a lighting control device 1200, and forms a light distribution pattern in accordance with a position of a forward vehicle or the like that exists in front of the vehicle. The lighting control device 1200 comprises a camera that takes an image of an area in front of the vehicle, an image processing part that detects a position of the forward vehicle or the like based on the image obtained by this camera, a control part that sets a light irradiation range corresponding to the position of the forward vehicle or the like detected by the image processing part and drives the vehicle lamp unit 100, and the like. A vehicle headlamp system is configured to include the vehicle lamp unit 100 and the lighting control device 1200 (the same holds true for each embodiment hereinafter as well).

The light source 1*a* emits white light, and is a white LED that is configured by combining a yellow fluorescent substance with a light-emitting device (LED) that emits blue light, for example. It should be noted that, other than an LED, a laser or a light source generally used in a vehicle lamp unit, such as a light bulb or a discharge lamp, may be used as the light source 1*a* (the same holds true for each embodiment hereinafter as well).

The parallel optical system 2 turns the light emitted from the light source 1*a* into parallel light, and a convex lens may be used, for example. In this case, the light source 1*a* is disposed near a focal point of the convex lens, making it possible to produce parallel light. It should be noted that, as the parallel optical system 2, a lens, a reflector, or a combination thereof may be used (the same holds true for each embodiment hereinafter as well).

The polarizing beam splitter 3*a* splits the light emitted from the parallel optical system 2 into a P-wave and an S-wave. Examples of the polarizing beam splitter 3*a* used include a wire grid type polarizing beam splitter having a broad wavelength region. As such a polarizing beam splitter 3*a*, there is a type in which a wire grid polarizer is bonded and fixed between two right-angle prisms (such as, for example, a wire grid polarizing cube beam splitter manufactured by Edmund Optics Inc.).

The reflection-type liquid crystal element 4*a* reflects one polarized beam emitted from the polarizing beam splitter 3*a* without rotation of the polarization direction or with rotation of the polarization direction, in accordance with a size of voltage applied to a liquid crystal layer by the lighting control device 1200. Examples of this reflection-type liquid crystal element 4*a* used include a twisted nematic (TN) mode liquid crystal element having a 45-degree twist that comprises a liquid crystal layer disposed between upper and lower substrates, wherein liquid crystal molecules of the liquid crystal layer are twisted 45 degrees between the upper substrate and the lower substrate and horizontally oriented. A reflective film made of aluminum is provided on an outer side (or an inner side) of a back substrate of the reflection-type liquid crystal element 4*a*.

The reason for using a TN mode liquid crystal element as the reflection-type liquid crystal element 4*a* is to reflect a polarized beam having a broad wavelength band upon rotation of the polarization direction by 90 degrees by orienting the liquid crystal molecules in a twisted manner. This reflection-type liquid crystal element 4*a* is capable of reflecting the polarized beam from the polarizing beam splitter 3*a* by rotating the beam by substantially 90 degrees when no voltage is applied to the liquid crystal layer, and reflecting the beam without rotation when voltage is applied. These two states can be switched based on a signal (voltage applied to the liquid crystal element) from the lighting control device 1200.

The projection optical system 5*a* expands the parallel light that was reflected by the reflection-type liquid crystal element 4*a* and passed through the polarizing beam splitter 3*a* once again, and projects the light in front of the vehicle so that the parallel light forms a predetermined light distribution for the headlight, and a suitably designed lens is used therefor. It should be noted that, as the projection optical system 5*a*, a lens, a reflector, or a combination thereof may be used (the same holds true for each embodiment hereinafter as well).

Figure 2:
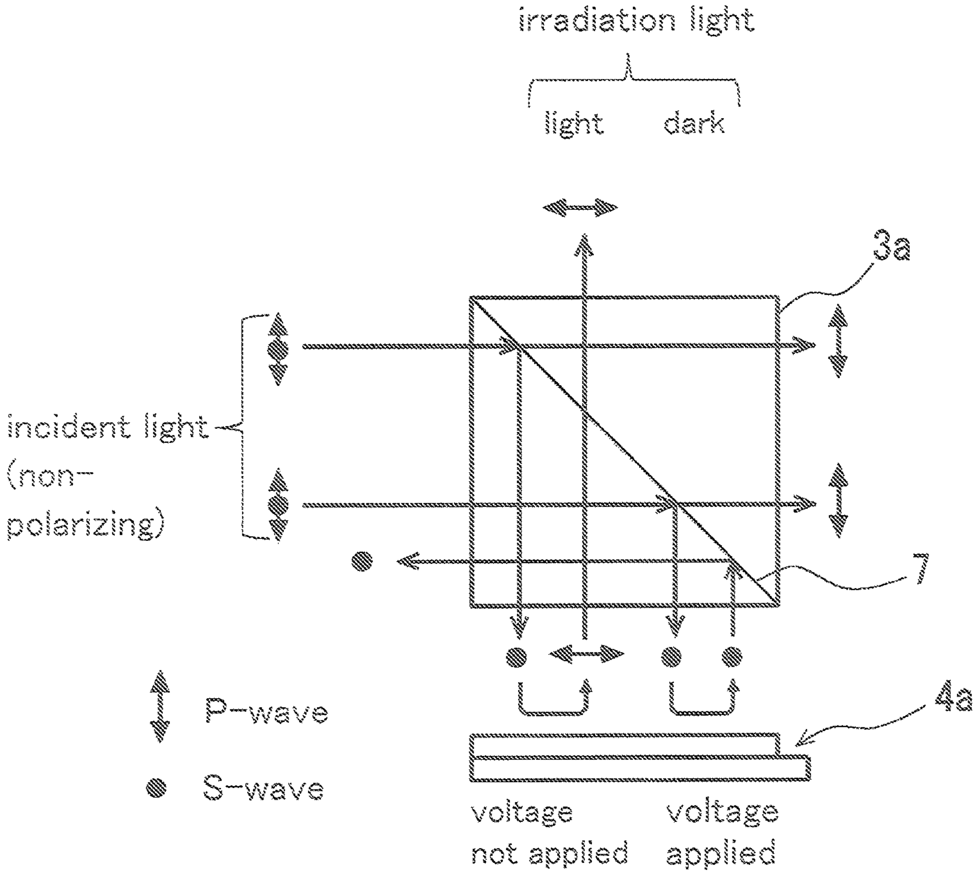
FIG. 2 is a drawing for describing the principle by which the contrast of the irradiating light of the vehicle lamp unit of embodiment 1 is switched.

FIG. 2 is a drawing for describing the principle by which the contrast of the irradiating light of the vehicle lamp unit of embodiment 1 is switched. Hence, among the components of the vehicle lamp unit 100, FIG. 2 extracts and illustrates the polarizing beam splitter 3*a* and the reflection-type liquid crystal element 4*a*, and describes the principle by which the contrast of the irradiating light is switched by these components.

The parallel light that enters the polarizing beam splitter 3*a* is non-polarizing, and therefore has both the P-wave and the S-wave components. At a wire grid polarizer 7, which is a polarized beam separating section of the polarizing beam splitter 3*a*, this parallel light is split into the P-wave that passes straight through the polarizing beam splitter 3*a* and is emitted from a right side surface of the polarizing beam splitter 3*a*, and the S-wave that changes in angle by 90 degrees (beam traveling direction) by reflection, is emitted from a lower (bottom) side surface of the polarizing beam splitter 3*a*, and enters the reflection-type liquid crystal element 4*a*.

When the voltage of the reflection-type liquid crystal element 4*a* is not applied, the S-wave that entered the reflection-type liquid crystal element 4*a* travels back and forth passing through the liquid crystal layer, causing the polarization direction to rotate by 90 degrees, and forms the P-wave, which is emitted from the reflection-type liquid crystal element 4*a* and enters the polarizing beam splitter 3*a* once again. The P-wave that entered this polarizing beam splitter 3*a* passes straight through the wire grid polarizer 7. When the voltage of the reflection-type liquid crystal element 4*a* is thus not applied, the light that irradiates through the projection optical system 5*a* is in a light state.

On the other hand, when the voltage of the reflection-type liquid crystal element 4*a* is applied, the S-wave that entered the reflection-type liquid crystal element 4*a* is emitted from the reflection-type liquid crystal element 4*a* as the S-wave without a change in the polarization direction, even if the S-wave travels back and forth passing through the liquid crystal layer, and enters the polarizing beam splitter 3*a* once again. The S-wave that entered this polarizing beam splitter 3*a* changes in angle by 90 degrees (beam traveling direction) by reflection at the wire grid polarizer 7, and returns to the light source 1*a* side. When the voltage of the reflection-type liquid crystal element 4*a* is thus applied, the light that irradiates through the projection optical system 5*a* is in a dark state.

With the light state and the dark state thus controlled per pixel (predetermined section) of the reflection-type liquid crystal element 4*a*, a preferred light distribution pattern is formed. It should be noted that, because the P-wave of the parallel light that enters the polarizing beam splitter 3*a* passes through the polarizing beam splitter 3*a* without entering the reflection-type liquid crystal element 4*a*, a light absorbing member is also preferably provided on an outer side of the polarizing beam splitter 3*a*.

Embodiment 2

Figure 3:
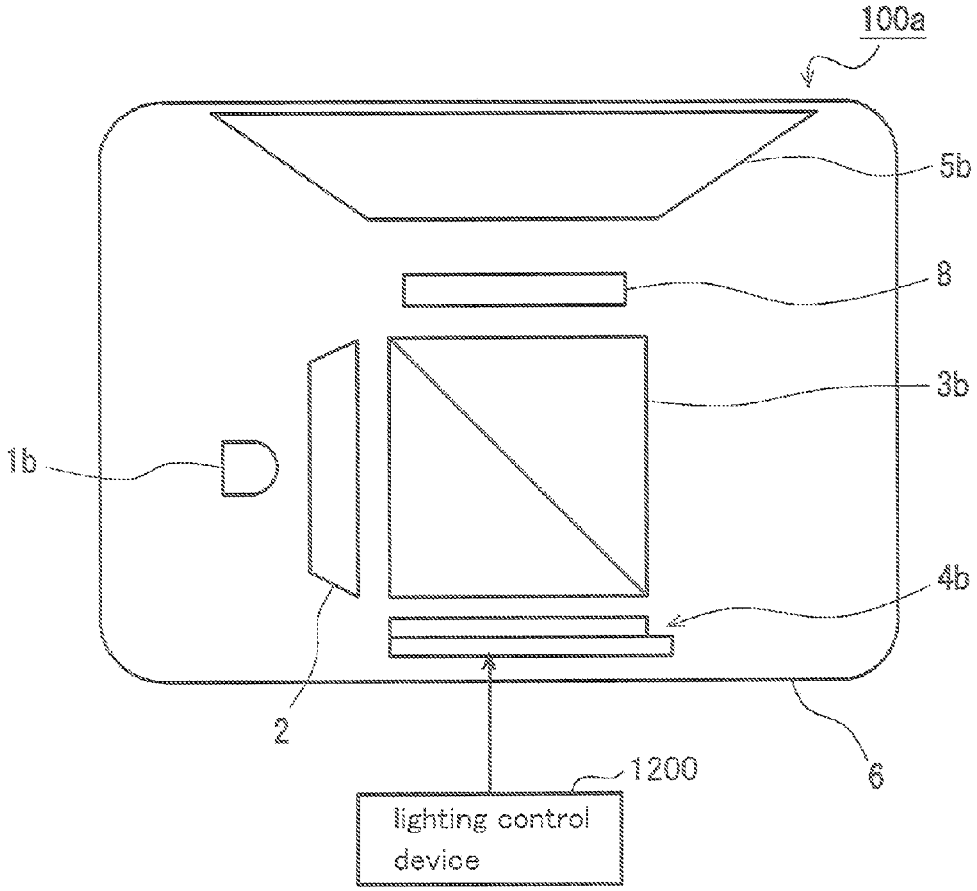
FIG. 3 is a schematic drawing for describing a vehicle lamp unit of embodiment 2.

FIG. 3 is a schematic drawing for describing a vehicle lamp unit of embodiment 2. A vehicle lamp unit 100*a* of embodiment 2 is configured to include a light source 1*b*, a parallel optical system 2, a polarizing beam splitter 3*b*, a reflection-type liquid crystal element 4*b*, a projection optical system 5*b*, a fluorescent substance 8, and a lamp unit housing 6 that houses these. This vehicle lamp unit 100*a* is controlled by a lighting control device 1200, and forms a light distribution pattern in accordance with a position of a forward vehicle or the like that exists in front of the vehicle.

The light source 1*b* emits a light having a single wavelength, and is a light-emitting device (LED) that emits blue light, for example.

The parallel optical system 2 turns the light having a single wavelength emitted from the light source 1*b* into parallel light, and a convex lens may be used, for example. In this case, the light source 1*b* is disposed near a focal point of the convex lens, making it possible to produce parallel light.

The polarizing beam splitter 3*b* splits the light emitted from the parallel optical system 2 into a P-wave and an S-wave. Examples of the polarizing beam splitter 3*b* used include a beam splitter that uses a dielectric multilayer film corresponding to the wavelength range of the light source 1*b*. As such a polarizing beam splitter 3*b*, there is a polarizing beam splitter manufactured by Sigmakoki Co., Ltd., or the like.

The reflection-type liquid crystal element 4*b* reflects one polarized beam emitted from the polarizing beam splitter 3*b* without rotation of the polarization direction or with rotation of the polarization direction, in accordance with a size of voltage applied to a liquid crystal layer by the lighting control device 1200. Examples of the reflection-type liquid crystal element 4*b* used include a liquid crystal element comprising upper and lower substrates and a liquid crystal layer inserted therebetween, wherein the liquid crystal molecules of the liquid crystal layer are vertically uniaxially oriented between the upper substrate and the lower substrate. A reflective film made of aluminum is provided on an outer side (or an inner side) of the back substrate of the reflection-type liquid crystal element 4*b*.

The reason for using a vertical alignment type liquid crystal element as the reflection-type liquid crystal element 4*b* is that there is zero retardation when voltage is not applied to the liquid crystal layer and thus the entered polarized beam is reflected and emitted without any change (without rotation of the polarization direction), making it possible to darken the dark state of the illuminating light to the greatest extent. Further, when the voltage is applied to the liquid crystal layer, the entered polarized beam is reflected upon rotation by 90 degrees and then emitted, making it possible to produce a light state of the illuminating light. These two states can be switched based on the signal (voltage applied to the liquid crystal element) from the lighting control device 1200. While the polarized beam can be rotated by 90 degrees by matching the retardation of the reflection-type liquid crystal element 4*b*, which is a vertical alignment type, to one-fourth the wavelength, the value differs due to the wavelength of the incident light, that is, the value is wavelength dependent. In this embodiment, however, a light source that emits light having a single wavelength is used as the light source 1*b*, and therefore there is no need to take wavelength dependency into consideration.

A fluorescent substance 8 is disposed so that the light emitted from the polarizing beam splitter 3*b* enters therein, and produces light (fluorescent light) which occurs upon excitation by the entered light having a single wavelength and has a wavelength that differs from the light having this single wavelength. Examples of the fluorescent substance 8 used include a fluorescent substance plate obtained by mixing a yttrium aluminum garnet (YAG) fluorescent substance and a scattered substance and then hardening the mixture, or a fluorescent substance obtained by coating a transparent substrate with a fluorescent substance. A portion of the components of the light (blue light) having a single wavelength, which was reflected by the reflection-type liquid crystal element 4*b* and passed through the polarizing beam splitter 3*b* once again, excites the fluorescent substance 8 and produces yellow light, and the remaining components of the blue light are emitted from the fluorescent substance 8 as is. At this time, the yellow light becomes scattered light from the fluorescent substance 8, the blue light similarly becomes scattered light by the scattered substance, and the colors of these lights are mixed to form a white scattered light, which is emitted from the fluorescent substance 8.

The projection optical system 5*b* expands the scattered light that passed through the fluorescent substance 8 so that the light forms a predetermined light distribution for a headlight, and projects the light in front of the vehicle, and a suitably designed lens is used therefor.

Figure 4:
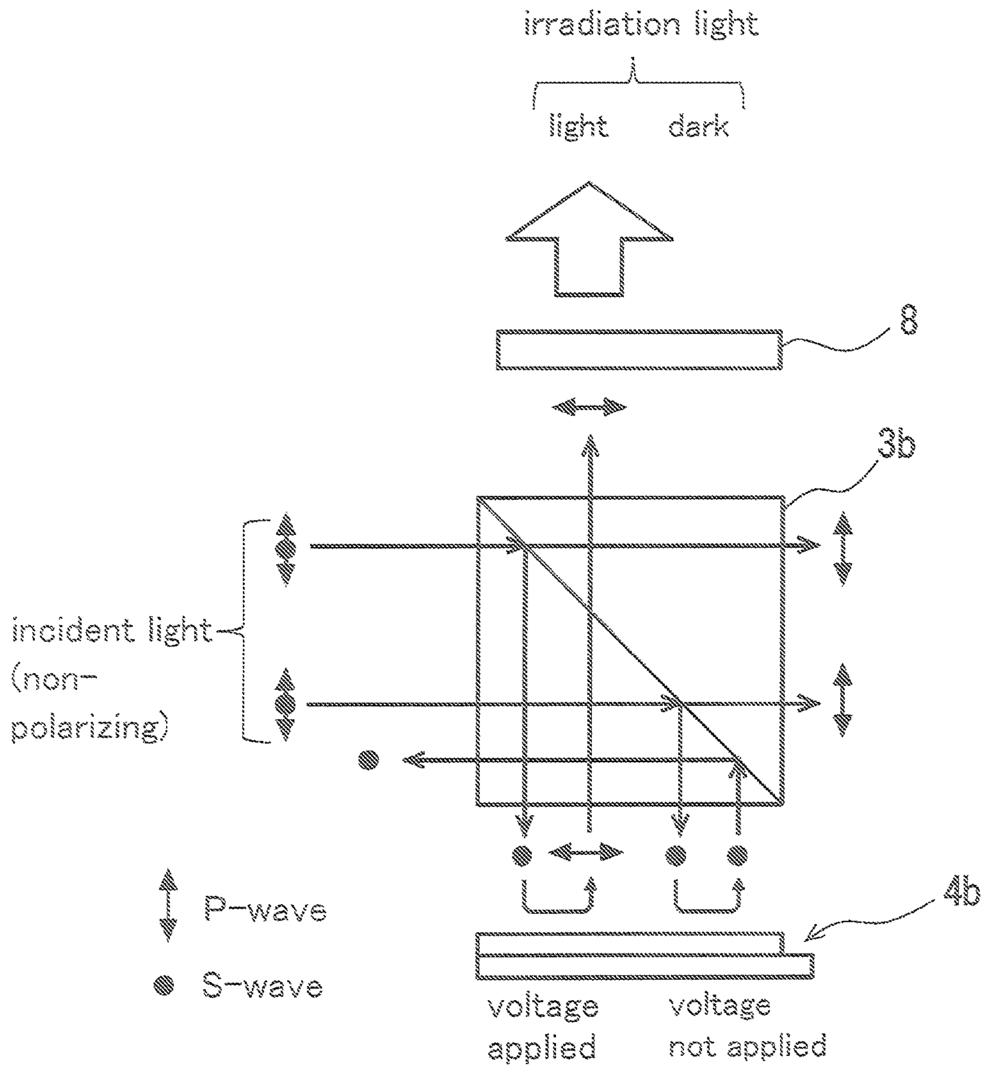
FIG. 4 is a drawing for describing the principle by which the contrast of the irradiating light of the vehicle lamp unit of embodiment 2 is switched.

FIG. 4 is a drawing for describing the principle by which the contrast of the irradiating light of the vehicle lamp unit of embodiment 2 is switched. Hence, among the components of the vehicle lamp unit 100*a*, FIG. 4 extracts and illustrates the polarizing beam splitter 3*b*, the reflection-type liquid crystal element 4*b* and the fluorescent substance 8, and describes the principle by which the contrast of the irradiating light is switched by these components.

The parallel light that enters the polarizing beam splitter 3*b* is non-polarizing, and therefore has both the P-wave and the S-wave components. At the dielectric multilayer film, which is a polarized beam separating section of the polarizing beam splitter 3*b*, this parallel light is split into the P-wave that passes straight through the polarizing beam splitter 3*b* and is emitted from a right side surface of the polarizing beam splitter 3*b*, and the S-wave that changes in angle by 90 degrees (beam traveling direction) by reflection, is emitted from a lower (bottom) side surface of the polarizing beam splitter 3*b*, and enters the reflection-type liquid crystal element 4*b*.

When the voltage of the reflection-type liquid crystal element 4*b* is not applied, the S-wave that entered the reflection-type liquid crystal element 4*b* is emitted from the reflection-type liquid crystal element 4*b* as the S-wave without a change in the polarization direction, even if the S-wave travels back and forth passing through the liquid crystal layer, and enters the polarizing beam splitter 3*b* once again. The S-wave that entered this polarizing beam splitter 3*b* changes in angle by 90 degrees by reflection at the dielectric multilayer film which is a polarized beam separating section of the polarizing beam splitter 3*b*, and returns to the light source 1*b* side. When the voltage of the reflection-type liquid crystal element 4*b* is thus not applied, the light that irradiates through the projection optical system 5*b* is in a dark state.

When the voltage of the reflection-type liquid crystal element 4*b* is applied, the S-wave that entered the reflection-type liquid crystal element 4*b* passes through the liquid crystal layer, causing the polarization direction to rotate by 90 degrees, and forms the P-wave, which is emitted from the reflection-type liquid crystal element 4*b* and enters the polarizing beam splitter 3*b* once again. The P-wave that entered this polarizing beam splitter 3*b* passes straight through the dielectric multilayer film. When the voltage of the reflection-type liquid crystal element 4*b* is thus applied, the light that irradiates through the projection optical system 5*b* is in a light state.

With the light state and the dark state thus controlled per pixel (predetermined section) of the reflection-type liquid crystal element 4*b*, a preferred light distribution pattern is formed. It should be noted that, because the P-wave of the parallel light that enters the polarizing beam splitter 3*b* passes through the polarizing beam splitter 3*b* without entering the reflection-type liquid crystal element 4*b*, a light absorbing member is also preferably provided on an outer side of the polarizing beam splitter 3*b*.

Embodiment 3

The configuration of the vehicle lamp unit of embodiment 3 is basically the same as that of embodiment 1 and embodiment 2 described above, and thus illustrations thereof are omitted. The difference from embodiment 1 and the like is the use of a light source that produces polarized beams (such as a semiconductor laser element, for example). It should be noted that, because the laser beam is originally a parallel light but with a small beam diameter, a beam expander (such as that manufactured by Sigmakoki Co., Ltd., for example) is used as the parallel optical system 2.

Figure 5:
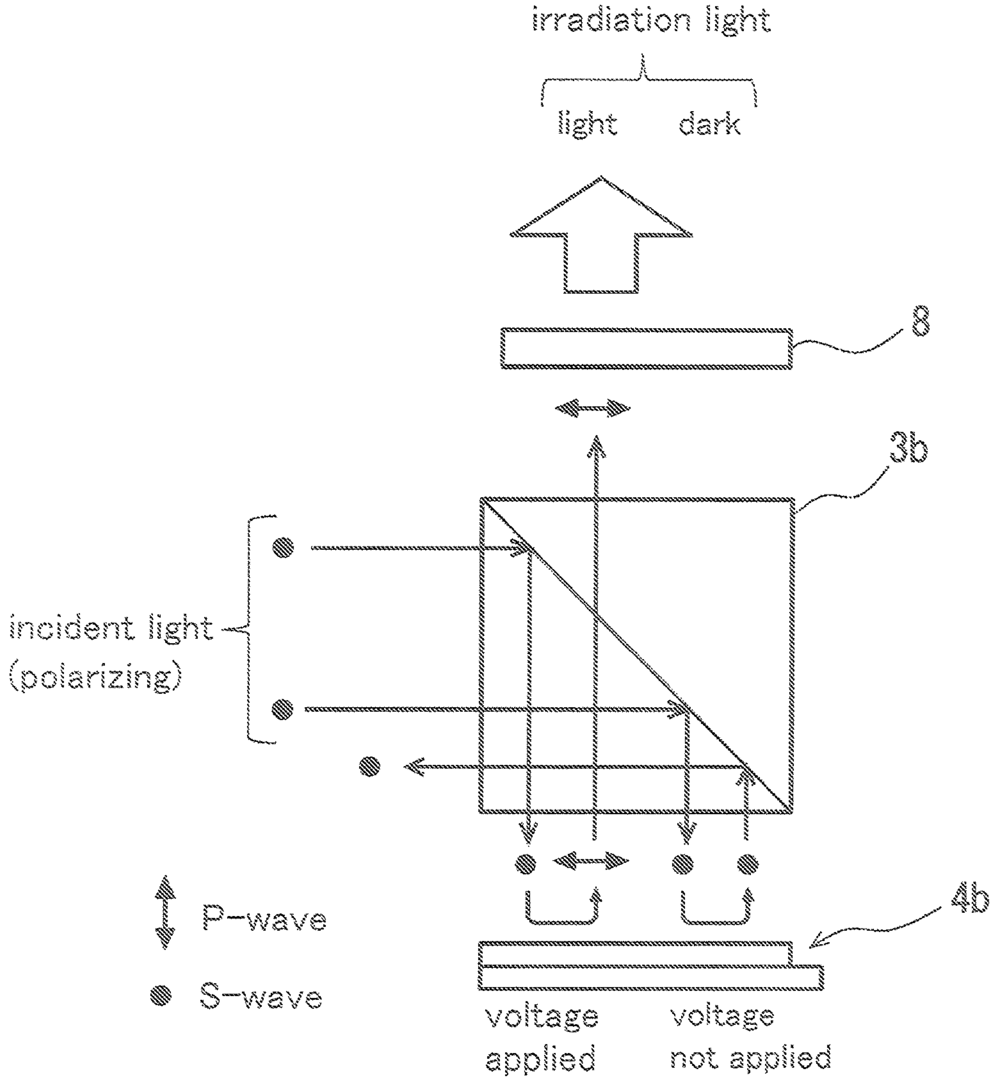
FIG. 5 is a drawing for describing the principle by which the contrast of the irradiating light of the vehicle lamp unit of embodiment 3 is switched.

FIG. 5 is a drawing for describing the principle by which the contrast of the irradiating light of the vehicle lamp unit of embodiment 3 is switched. Among the components of the vehicle lamp unit 100*a*, FIG. 5 extracts and illustrates the polarizing beam splitter 3*b*, the reflection-type liquid crystal element 4*b*, and the fluorescent substance 8, and describes the principle by which the contrast of the irradiating light is switched by these, under the premise of the same configuration as embodiment 2 (refer to FIG. 3).

The parallel light that enters the polarizing beam splitter 3*b* is the polarized beam of the S-wave only. This parallel light changes in angle by 90 degrees (beam traveling direction) by reflection at the dielectric multilayer film, which is a polarizing separating section of the polarizing beam splitter 3*b*, is emitted from the lower (bottom) surface side of the polarizing beam splitter 3*b*, and enters the reflection-type liquid crystal element 4*b*.

When the voltage of the reflection-type liquid crystal element 4*b* is not applied, the S-wave that entered the reflection-type liquid crystal element 4*b* is emitted from the reflection-type liquid crystal element 4*b* as the S-wave without a change in the polarization direction, even if the S-wave travels back and forth passing through the liquid crystal layer, and enters the polarizing beam splitter 3*b* once again. The S-wave that entered this polarizing beam splitter 3*b* changes in angle by 90 degrees by reflection at the dielectric multilayer film, and returns to the light source 1*b* side. When the voltage of the reflection-type liquid crystal element 4*b* is thus not applied, the light that irradiates through the projection optical system 5*b* is in a dark state.

When the voltage of the reflection-type liquid crystal element 4*b* is applied, the S-wave that entered the reflection-type liquid crystal element 4*b* passes through the liquid crystal layer, causing the polarization direction to rotate by 90 degrees, and forms the P-wave, which is emitted from the reflection-type liquid crystal element 4*b* and enters the polarizing beam splitter 3*b* once again. The P-wave that entered this polarizing beam splitter 3*b* passes straight through the dielectric multilayer film. When the voltage of the reflection-type liquid crystal element 4*b* is thus applied, the light that irradiates through the projection optical system 5*b* is in a light state.

The light (blue light) emitted from the polarizing beam splitter 3*b* enters the fluorescent substance 8, is changed to white light, and then emitted. With the light state and the dark state thus controlled per pixel (predetermined section) of the reflection-type liquid crystal element 4*b*, a preferred light distribution pattern is formed. If all of the parallel light that enters is light having the S-wave as in this embodiment, all of the light can be used, making it possible to increase a light utilization rate.

Embodiment 4

Figure 6:
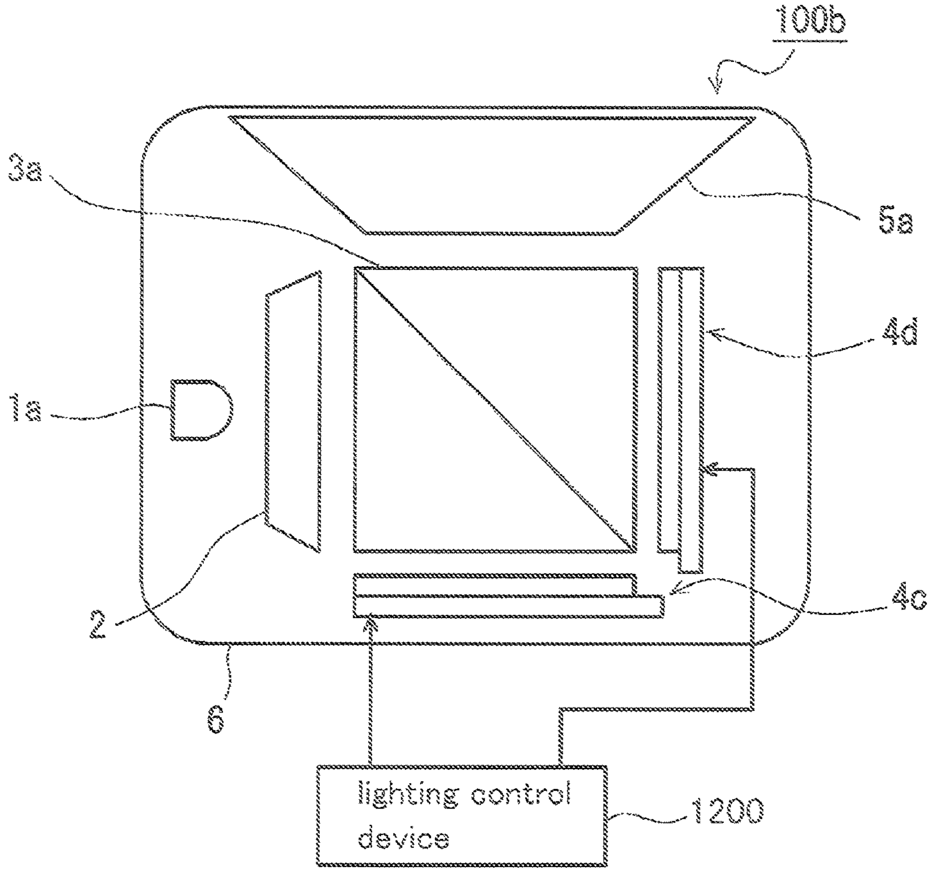
FIG. 6 is a schematic drawing for describing a vehicle lamp unit of embodiment 4.

FIG. 6 is a schematic drawing for describing a vehicle lamp unit of embodiment 4. A vehicle lamp unit 100*b* of embodiment 4 is configured to include a light source 1*a*, a parallel optical system 2, a polarizing beam splitter 3*a*, reflection-type liquid crystal elements 4*c* and 4*d*, a projection optical system 5*a*, and a lamp unit housing 6 that houses these. This vehicle lamp unit 100*b* differs from the vehicle lamp unit 100 of embodiment 1 described above only in that one reflection-type liquid crystal element is further added, and therefore descriptions of the components common to both are omitted.

The two reflection-type liquid crystal elements 4*c* and 4*d* each have the same configuration as the reflection-type liquid crystal element 4*a* in the vehicle lamp unit 100 of embodiment 1 described above. The reason for using a TN mode liquid crystal element as the reflection-type liquid crystal elements 4*c* and 4*d* is to reflect the polarized beam having a broad wavelength band upon rotation of the polarization direction by 90 degrees by orienting the liquid crystal molecules in a twisted manner. These reflection-type liquid crystal elements 4*c* and 4*d* are capable of reflecting the polarized beam from the polarizing beam splitter 3*a* by rotating the beam by substantially 90 degrees when voltage is not applied to the liquid crystal layer, and reflecting the beam without rotation when voltage is applied. These two states can be switched based on the signal (voltage applied to the liquid crystal element) from the lighting control device 1200.

Specifically, one reflection-type liquid crystal element 4*c* is for controlling the S-wave split by the polarizing beam splitter 3*a*, and is disposed on the lower side surface of the polarizing beam splitter 3*a* in the drawing. The other reflection-type liquid crystal element 4*d* is for controlling the P-wave split by the polarizing beam splitter 3*a*, and is disposed on the right side surface of the polarizing beam splitter 3*a* in the drawing.

The projection optical system 5*a* expands the parallel light which was reflected from two reflection-type liquid crystal elements 4*c* and 4*d*, and combined and emitted by the polarizing beam splitter 3*a* once again, so that the light forms the predetermined light distribution for the headlight.

Figure 7:
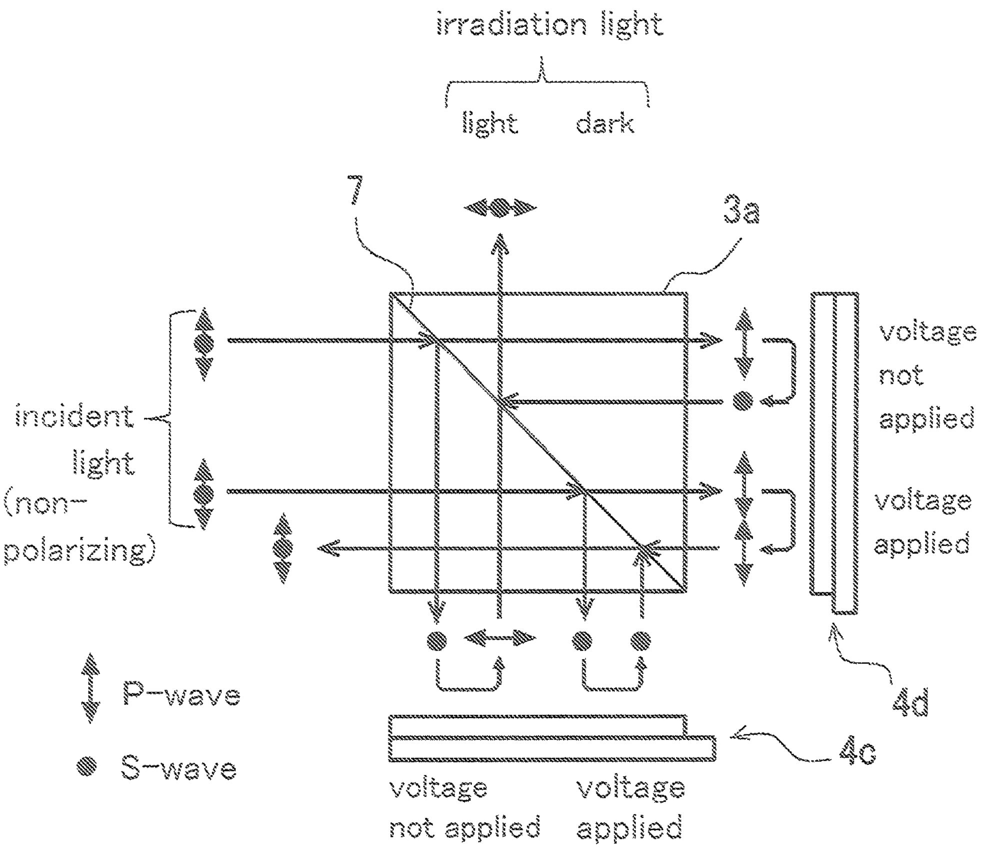
FIG. 7 is a drawing for describing the principle by which the contrast of the irradiating light of the vehicle lamp unit of embodiment 4 is switched.

FIG. 7 is a drawing for describing the principle by which the contrast of the irradiating light of the vehicle lamp unit of embodiment 4 is switched. Hence, among the components of the vehicle lamp unit 100*b*, FIG. 7 extracts and illustrates the polarizing beam splitter 3*a*, two of the reflection-type liquid crystal elements 4*c* and 4*d*, and describes the principle by which the contrast of the irradiating light is switched by these components.

The parallel light that enters the polarizing beam splitter 3*a* is non-polarizing, and therefore has both the P-wave and the S-wave components. At a wire grid polarizer 7, which is a polarized beam separating section of the polarizing beam splitter 3*a*, this parallel light is split into the P-wave that passes straight through the polarizing beam splitter 3*a* and is emitted from a right side surface of the polarizing beam splitter 3*a*, and the S-wave that changes in angle by 90 degrees (beam traveling direction) by reflection, is emitted from a lower side surface of the polarizing beam splitter 3*a*, and enters the reflection-type liquid crystal element 4*c*.

When the voltage of the reflection-type liquid crystal element 4*c* is not applied, the S-wave that entered the reflection-type liquid crystal element 4*c* travels back and forth passing through the liquid crystal layer, causing the polarization direction to rotate by 90 degrees, and forms the P-wave, which is emitted from the reflection-type liquid crystal element 4*c* and enters the polarizing beam splitter 3*a* once again. The P-wave that entered this polarizing beam splitter 3*a* passes straight through the wire grid polarizer 7. When the voltage of the reflection-type liquid crystal element 4*c* is thus not applied, the light that irradiates through the projection optical system 5*a* is in a light state.

And when the voltage of the reflection-type liquid crystal element 4*d* is not applied, the P-wave that entered the reflection-type liquid crystal element 4*d* passes through the liquid crystal layer, causing the polarization direction to rotate by 90 degrees, and forms the S-wave, which is emitted from the reflection-type liquid crystal element 4*d* and enters the polarizing beam splitter 3*a* once again. The S-wave that entered this polarizing beam splitter 3*a* changes in angle by 90 degrees (beam traveling direction) by reflection at the wire grid polarizer 7, and is emitted from the polarizing beam splitter 3*a* as irradiating light. When the voltage of the reflection-type liquid crystal element 4*d* is thus not applied, the light that irradiates through the projection optical system 5*a* is in a light state.

On the other hand, when the voltage of the reflection-type liquid crystal element 4*c* is applied, the S-wave that entered the reflection-type liquid crystal element 4*c* is emitted from the reflection-type liquid crystal element 4*c* as the S-wave without a change in the polarization direction, even if the S-wave passes through the liquid crystal layer, and enters the polarizing beam splitter 3*a* once again. The S-wave that entered this polarizing beam splitter 3*a* changes in angle by 90 degrees (beam traveling direction) by reflection at the wire grid polarizer 7, and returns to the light source 1*a* side. When the voltage of the reflection-type liquid crystal element 4*c* is thus applied, the light that irradiates through the projection optical system 5*a* is in a dark state.

And when the voltage of the reflection-type liquid crystal element 4*d* is applied, the P-wave that entered the reflection-type liquid crystal element 4*d* is emitted from the reflection-type liquid crystal element 4*d* as the P-wave without a change in the polarization direction, even if the P-wave passes through the liquid crystal layer, and enters the polarizing beam splitter 3*a* once again. The P-wave that entered this polarizing beam splitter 3*a* passes straight through the wire grid polarizer 7, and returns to the light source 1*a* side. When the voltage of the reflection-type liquid crystal element 4*d* is thus applied, the light that irradiates through the projection optical system 5*a* is in a dark state.

Figure 8A:
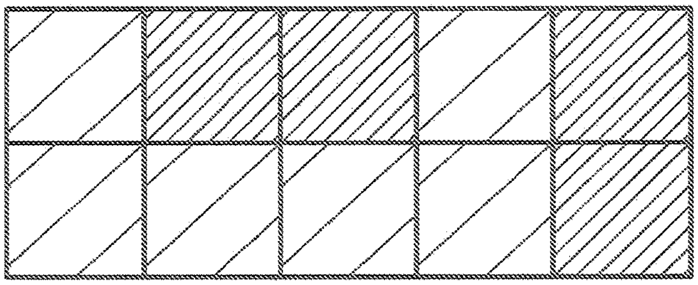
FIGS. 8A, 8B, 8C are drawings for describing the superimposition of the light distribution patterns.
Figure 8B:
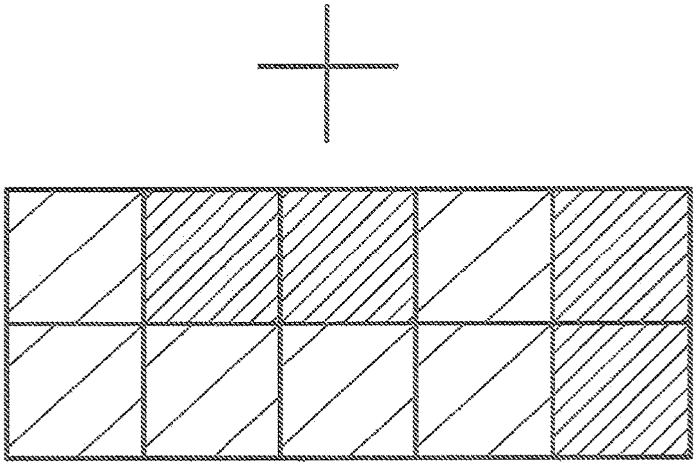
Figure 8C:
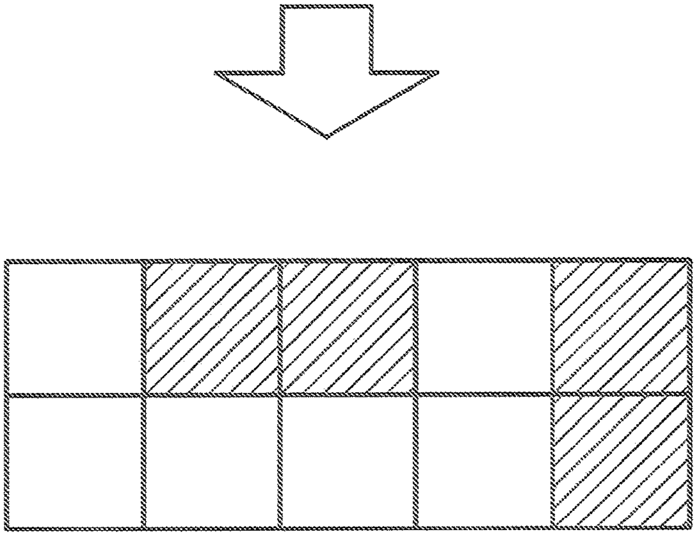

With the light state and the dark state thus controlled per pixel (predetermined section) of the reflection-type liquid crystal elements 4*c* and 4*d*, a preferred light distribution pattern is formed. Here, the emitted beams respectively reflected by the two reflection-type liquid crystal elements 4*c* and 4*d* are combined in the polarizing beam splitter 3*a*. At this time, if the light distribution patterns used by the two reflection-type liquid crystal elements 4*c* and 4*d* are made exactly the same and superimposed in the same position, it is possible to achieve a vehicle lamp unit having a high light usage efficiency and a high light-dark contrast. FIG. 8A illustrates an example of the light distribution pattern by one reflection-type liquid crystal element 4*c*, FIG. 8B illustrates an example of the light distribution pattern by the other reflection-type liquid crystal element 4*d*, and FIG. 8C illustrates an example of the combined light distribution pattern.

Figure 9A:
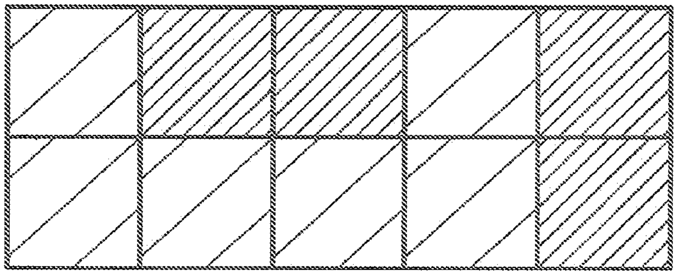
FIGS. 9A, 9B, 9C are drawings for describing the superimposition of the light distribution patterns.
Figure 9B:
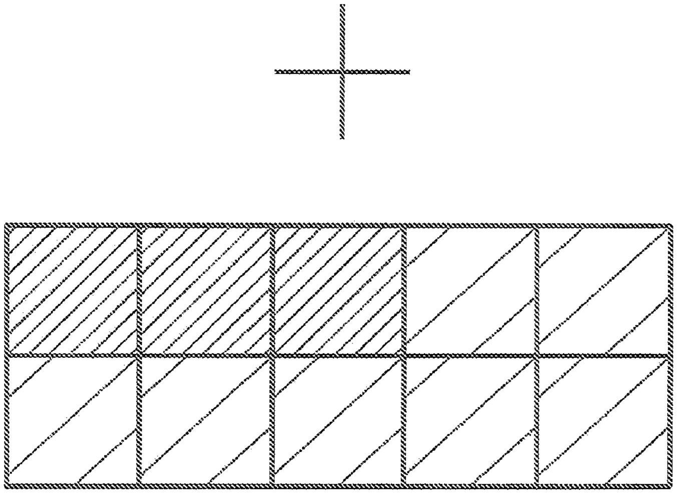
Figure 9C:
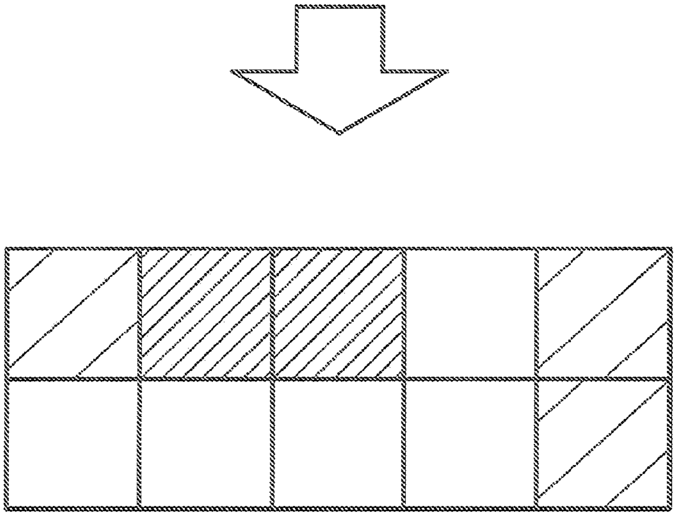

Further, if the light distribution patterns used by the two reflection-type liquid crystal elements 4*c* and 4*d* are made to differ, or if the light distribution patterns used are exactly the same and superimposed with the positions shifted, it is possible to achieve a vehicle lamp unit capable of controlling three types of brightness, including a brightest section in which the light from each light distribution pattern is combined, an intermediate bright section having only the light from one pattern, and a darkest section not reached by either reflected light patterns. FIG. 9A illustrates an example of the light distribution pattern by one reflection-type liquid crystal element 4*c*, FIG. 9B illustrates an example of the light distribution pattern by the other reflection-type liquid crystal element 4*d*, and FIG. 9C illustrates an example of the combined light distribution pattern.

Embodiment 5

Figure 10:
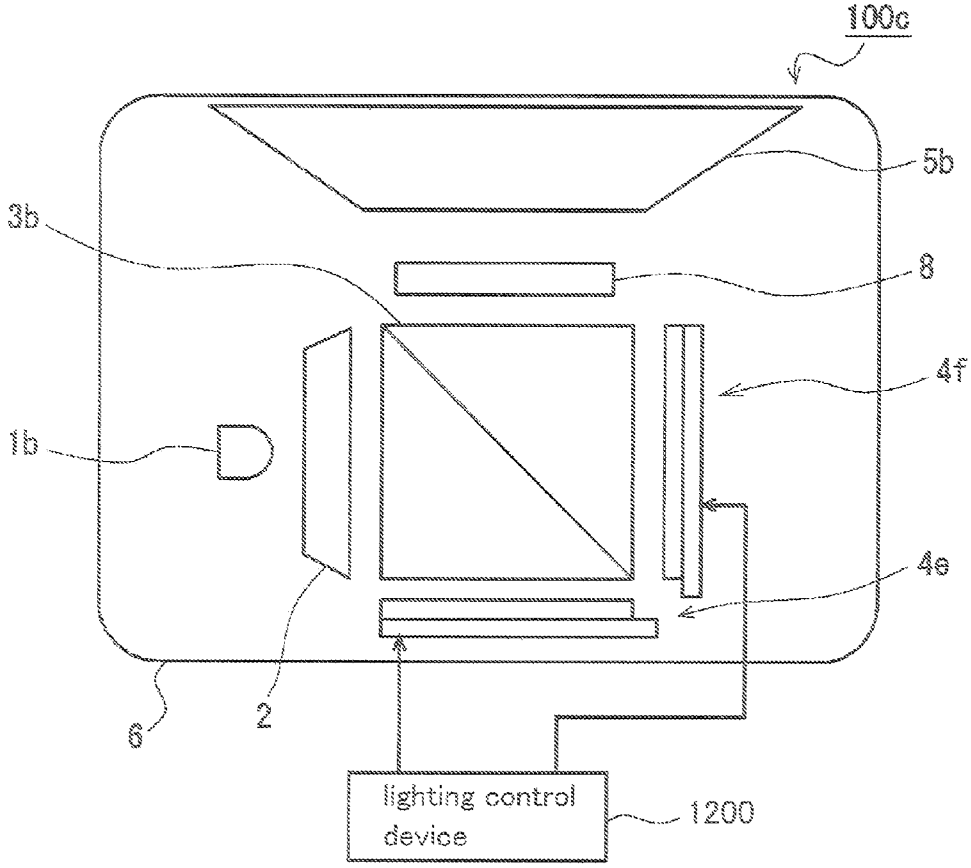
FIG. 10 is a schematic drawing for describing a vehicle lamp unit of embodiment 5.

FIG. 10 is a schematic drawing for describing a vehicle lamp unit of embodiment 5. A vehicle lamp unit 100*c* of embodiment 5 is configured to include a light source 1*b*, a parallel optical system 2, a polarizing beam splitter 3*b*, reflection-type liquid crystal elements 4*e* and 4*f*, a projection optical system 5*b*, a fluorescent substance 8, and a lamp unit housing 6 that houses these. This vehicle lamp unit 100*c* differs from the vehicle lamp unit 100*a* of embodiment 2 described above only in that one reflection-type liquid crystal element is further added, and therefore descriptions of the components common to both are omitted.

The two reflection-type liquid crystal elements 4*e* and 4*f* each have the same configuration as the reflection-type liquid crystal element 4*b* in the vehicle lamp unit 100*a* of embodiment 2 described above. The reason for using a vertical alignment type liquid crystal element as the reflection-type liquid crystal elements 4*e* and 4*f* is that there is zero retardation when voltage is not applied to the liquid crystal layer and thus the entered polarized beam is reflected and emitted without any change (without rotation of the polarization direction), making it possible to darken the dark state of the illuminating light to the greatest extent. Further, when the voltage is applied to the liquid crystal layer, the entered polarized beam is reflected upon rotation by 90 degrees and then emitted, making it possible to produce a light state of the illuminating light. These two states can be switched based on the signal (voltage applied to the liquid crystal element) from the lighting control device 1200. While the polarized beam can be rotated by 90 degrees by matching each of the retardation of the reflection-type liquid crystal elements 4*e* and 4*f*, which is a vertical alignment type, to one-fourth the wavelength, the value differs due to the wavelength of the incident light, that is, the value is wavelength dependent. In this embodiment, however, a light source that emits light having a single wavelength is used as the light source 1*b*, and therefore there is no need to take wavelength dependency into consideration.

One reflection-type liquid crystal element 4*e* is for controlling the S-wave split by the polarizing beam splitter 3*b*, and is disposed on the lower side surface of the polarizing beam splitter 3*b* in the drawing. The other reflection-type liquid crystal element 4*f* is for controlling the P-wave split by the polarizing beam splitter 3*b*, and is disposed on the right side surface of the polarizing beam splitter 3*b* in the drawing.

Figure 11:
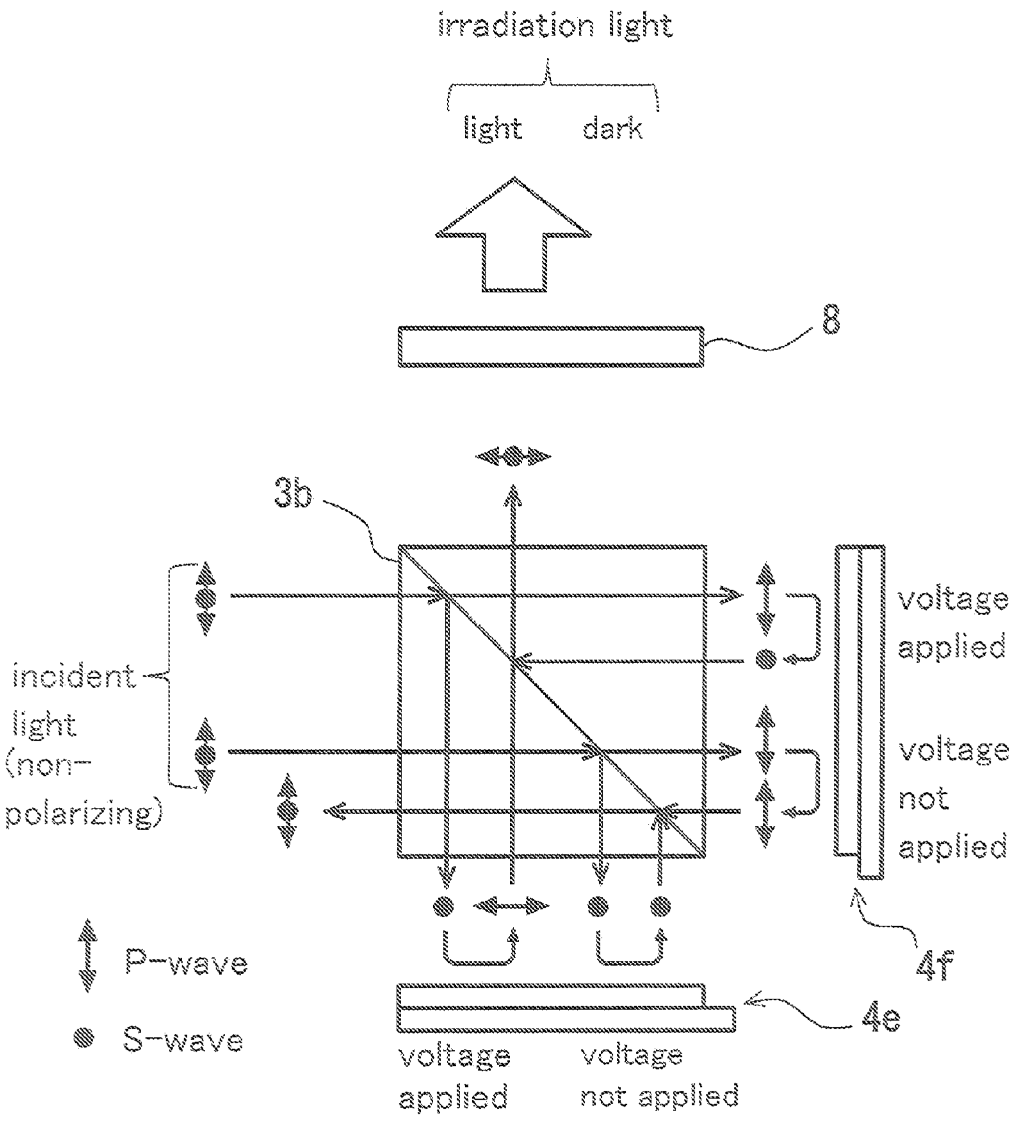
FIG. 11 is a drawing for describing the principle by which the contrast of the irradiating light of the vehicle lamp unit of embodiment 5 is switched.

FIG. 11 is a drawing for describing the principle by which the contrast of the irradiating light of the vehicle lamp unit of embodiment 5 is switched. Hence, among the components of the vehicle lamp unit 100*c*, FIG. 11 extracts and illustrates the polarizing beam splitter 3*b*, the reflection-type liquid crystal elements 4*e* and 4*f*, and the fluorescent substance 8, and describes the principle by which the contrast of the irradiating light is switched by these components.

The parallel light that enters the polarizing beam splitter 3*b* is non-polarizing, and therefore has both the P-wave and the S-wave components. At a dielectric multilayer film, which is a polarized beam separating section of the polarizing beam splitter 3*b*, this parallel light is split into the P-wave that passes straight through the polarizing beam splitter 3*b* and is emitted from a right side surface of the polarizing beam splitter 3*b*, and the S-wave that changes in angle by 90 degrees (beam traveling direction) by reflection, is emitted from a lower side surface of the polarizing beam splitter 3*b*, and enters the reflection-type liquid crystal element 4*e*.

When the voltage of the reflection-type liquid crystal element 4*e* is not applied, the S-wave that entered the reflection-type liquid crystal element 4*e* is emitted from the reflection-type liquid crystal element 4*e* as the S-wave without a change in the polarization direction, even if the S-wave travels back and forth passing through the liquid crystal layer, and enters the polarizing beam splitter 3*b* once again. The S-wave that entered this polarizing beam splitter 3*b* changes in angle by 90 degrees (beam traveling direction) by reflection at a dielectric multilayer film, which is a polarized beam separating section of the polarizing beam splitter 3*b*, and returns to the light source 1*b* side. When the voltage of the reflection-type liquid crystal element 4*e* is thus not applied, the light that irradiates through the projection optical system 5*b* is in a dark state.

And when the voltage of the reflection-type liquid crystal element 4*f* is not applied, the P-wave that entered the reflection-type liquid crystal element 4*f* is emitted from the reflection-type liquid crystal element 4*f* as the P-wave without a change in the polarization direction, even if the P-wave travels back and forth passing through the liquid crystal layer, and enters the polarizing beam splitter 3*b* once again. The P-wave that entered this polarizing beam splitter 3*b* passes straight through the dielectric multilayer film, which is a polarized beam separating section of the polarizing beam splitter 3*b*, and returns to the light source 1*b* side. When the voltage of the reflection-type liquid crystal element 4*f* is thus not applied, the light that irradiates through the projection optical system 5*b* is in a dark state.

When the voltage of the reflection-type liquid crystal element 4*e* is applied, the S-wave that entered the reflection-type liquid crystal element 4*e* travels back and forth passing through the liquid crystal layer, causing the polarization direction to rotate by 90 degrees, and forms the P-wave, which is emitted from the reflection-type liquid crystal element 4*e* and enters the polarizing beam splitter 3*b* once again. The P-wave that entered this polarizing beam splitter 3*b* passes straight through the dielectric multilayer film. When the voltage of the reflection-type liquid crystal element 4*e* is thus applied, the light that irradiates through the projection optical system 5*b* is in a light state.

When the voltage of the reflection-type liquid crystal element 4*f* is applied, the P-wave that entered the reflection-type liquid crystal element 4*f* travels back and forth passing through the liquid crystal layer, causing the polarization direction to rotate by 90 degrees, and forms the S-wave, which is emitted from the reflection-type liquid crystal element 4*f* and enters the polarizing beam splitter 3*b* once again. The S-wave that entered this polarizing beam splitter 3*b* changes in angle by 90 degrees (beam traveling direction) by reflection at a dielectric multilayer film, and is emitted from the polarizing beam splitter 3*b* as irradiating light. When the voltage of the reflection-type liquid crystal element 4*f* is thus applied, the light that irradiates through the projection optical system 5*b* is in a light state.

With the light state and the dark state thus controlled per pixel (predetermined section) of the reflection-type liquid crystal elements 4*e* and 4*f*, a preferred light distribution pattern is formed. Here, the emitted beams respectively reflected by the two reflection-type liquid crystal elements 4*e* and 4*f* are combined in the polarizing beam splitter 3*b*. At this time, if the light distribution patterns used by the two reflection-type liquid crystal elements 4*e* and 4*f* are made exactly the same and superimposed in the same position, it is possible to achieve a vehicle lamp unit having a high light usage efficiency and a high light-dark contrast. (Refer to the description of FIGS. 8A, 8B, 8C stated above.)

Further, if the light distribution patterns used by the two reflection-type liquid crystal elements 4*e* and 4*f* are made to differ, or if the light distribution patterns used are exactly the same and superimposed with the positions shifted, it is possible to achieve a vehicle lamp unit capable of controlling three types of brightness, including a brightest section in which the light from each light distribution pattern is combined, an intermediate bright section having only the light from one pattern, and a darkest section not reached by either reflected light patterns. (Refer to the description of FIGS. 9A, 9B, 9C stated above.)

Embodiment 6

Figure 12:
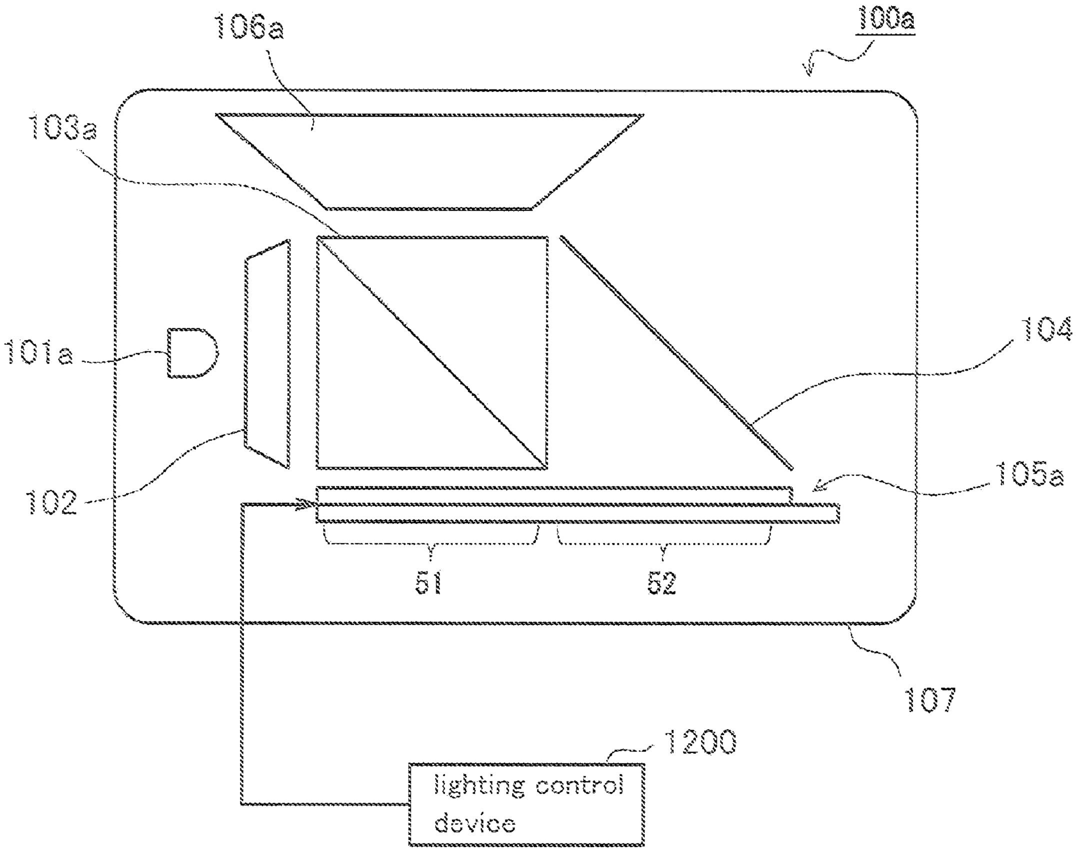
FIG. 12 is a schematic drawing for describing a vehicle lamp unit of embodiment 6.

FIG. 12 is a schematic drawing for describing a vehicle lamp unit (vehicle headlamp unit) of embodiment 6. A vehicle lamp unit 100*a* of embodiment 6 is configured to include a light source 101*a*, a parallel optical system 102, a polarizing beam splitter 103*a*, a reflector 104, a reflection-type liquid crystal element (light control means) 105*a*, a projection optical system 106*a*, and a lamp unit housing 107 that houses these.

This vehicle lamp unit 100*a* is controlled by a lighting control device 1200, and forms a light distribution pattern in accordance with a position of a forward vehicle or the like that exists in front of the vehicle. The lighting control device 1200 comprises a camera that takes an image of an area in front of the vehicle, an image processing part that detects a position of the forward vehicle or the like based on the image obtained by this camera, a control part that sets a light irradiation range corresponding to the position of the forward vehicle or the like detected by the image processing part and drives the vehicle lamp unit 100*a*, and the like. A vehicle headlamp system is configured to include the vehicle lamp unit 100*a* and the lighting control device 1200

The light source 101*a* emits white light, and is a white LED that is configured by combining a yellow fluorescent substance with a light-emitting device (LED) that emits blue light, for example. It should be noted that, other than an LED, a laser or a light source generally used in a vehicle lamp unit, such as a light bulb or a discharge lamp, may be used as the light source 101*a*.

The parallel optical system 102 turns the light emitted from the light source 101*a* into parallel light, and a convex lens may be used, for example. In this case, the light source 101*a* is disposed near a focal point of the convex lens, making it possible to produce parallel light. It should be noted that, as the parallel optical system 102, a lens, a reflector, or a combination thereof may be used.

The polarizing beam splitter 103*a* splits the light emitted from the parallel optical system 102 into a P-wave and a S-wave, which are two lights that differ in polarization direction, and emits the lights from a lower side surface (first surface) and a right side surface (second surface) in the drawing, respectively. Examples of the polarizing beam splitter 103*a* used include a wire grid type polarizing beam splitter having a broad wavelength region. As such a polarizing beam splitter 103*a*, for example, there is a type in which a wire grid polarizer is bonded and fixed between two right-angle prisms (such as, for example, a wire grid polarizing cube beam splitter manufactured by Edmund Optics Inc.).

The reflector 104 is disposed facing the right side surface of the polarizing beam splitter 103*a*, bends the light emitted from this right side surface by substantially 90 degrees, and reflects the light. Examples of the reflector 104 used include a plane mirror obtained by depositing silver on a surface of a glass substrate. In this case, the reflector 104 is disposed so that the surface thereof forms an angle of substantially 45 degrees with respect to an advancing path of the light (optical axis) emitted from the right side surface of the polarizing beam splitter 103*a*. (The same holds true for each embodiment hereinafter as well.)

The reflection-type liquid crystal element 105*a* includes a first region 51 into which the light emitted from the lower side surface of the polarizing beam splitter 103*a* enters, and a second region 52 into which the light that was emitted from the right side surface of the polarizing beam splitter 103*a* and reflected by the reflector 104 enters. In each of the first region 51 and the second region 52, the entered light is reflected without rotation of the polarization direction (first state) or reflected with rotation of the polarization direction (second state). The first state and the second state of the reflection-type liquid crystal element 105*a* can be switched in each predetermined section (pixel) in accordance with the size of voltage applied to the liquid crystal layer by the lighting control device 1200. Examples of this reflection-type liquid crystal element 105*a* used include a twisted nematic (TN) mode liquid crystal element having a 45-degree twist that comprises a liquid crystal layer disposed between upper and lower substrates, wherein liquid crystal molecules of the liquid crystal layer are twisted 45 degrees between the upper substrate and the lower substrate and horizontally oriented. A reflective film made of aluminum is provided on an outer side (or an inner side) of a back substrate of the reflection-type liquid crystal element 105*a*.

The reason for using a TN mode liquid crystal element as the reflection-type liquid crystal element 105*a* is to reflect a polarized beam having a broad wavelength band upon rotation of the polarization direction by 90 degrees by orienting the liquid crystal molecules in a twisted manner. This reflection-type liquid crystal element 105*a* is capable of reflecting the polarized beam from the polarizing beam splitter 103*a* by rotating the beam by substantially 90 degrees when no voltage is applied to the liquid crystal layer, and reflecting the beam without rotation when voltage is applied. These two states can be switched based on a signal (voltage applied to the liquid crystal element) from the lighting control device 1200.

The projection optical system 106*a* is a system that expands the light that was reflected in the first region 51 of the reflection-type liquid crystal element 105*a* and passed through the polarizing beam splitter 103*a* once again, and the light that was reflected in the second region 52 of the reflection-type liquid crystal element 105*a*, reflected by the reflector 104, and passed through the polarizing beam splitter 103*a* once again, so that the lights form a predetermined light distribution for the headlight, and projects the light in front of the vehicle, and a suitably designed lens is used therefor. It should be noted that, as the projection optical system 106*a*, a lens, a reflector, or a combination thereof may be used (the same holds true for each embodiment hereinafter as well).

Figure 13:
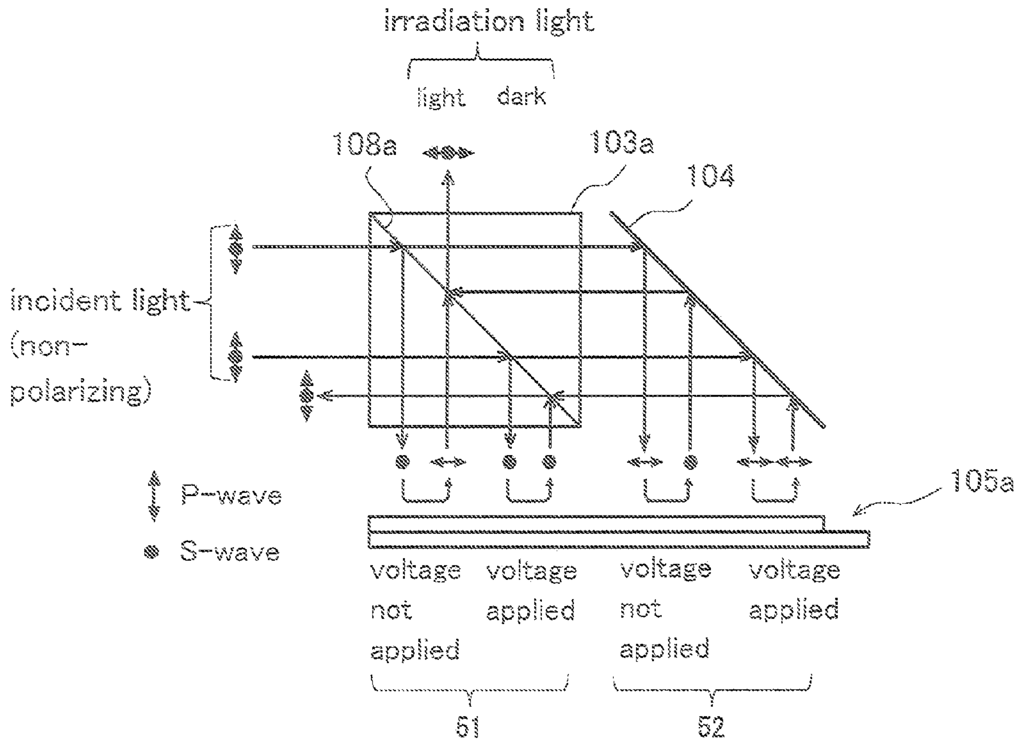
FIG. 13 is a drawing for describing the principle by which the contrast of the irradiating light of the vehicle lamp unit of embodiment 6 is switched.

FIG. 13 is a drawing for describing the principle by which the contrast of the irradiating light of the vehicle lamp unit of embodiment 6 is switched. Hence, among the components of the vehicle lamp unit 100*a*, FIG. 13 extracts and illustrates the polarizing beam splitter 103*a* and the reflection-type liquid crystal element 105*a*, and describes the principle by which the contrast of the irradiating light is switched by these components.

The parallel light that enters the polarizing beam splitter 103*a* is non-polarizing, and therefore has both the P-wave and the S-wave components. At a wire grid polarizer 108*a*, which is a polarized beam separating section of the polarizing beam splitter 103*a*, this parallel light is split into the P-wave that passes straight through the polarizing beam splitter 103*a* and is emitted from a right side surface of the polarizing beam splitter 103*a*, and the S-wave that changes in angle by 90 degrees (beam traveling direction) by reflection, is emitted from a lower side surface of the polarizing beam splitter 103*a*, and enters the reflection-type liquid crystal element 105*a*.

When the voltage of the reflection-type liquid crystal element 105*a* is not applied, the S-wave that entered into the first region 51 of the reflection-type liquid crystal element 105*a* travels back and forth passing through the liquid crystal layer, causing the polarization direction to rotate by 90 degrees, and forms the P-wave, which is emitted from the reflection-type liquid crystal element 105*a* and enters the polarizing beam splitter 103*a* once again. The P-wave that entered this polarizing beam splitter 103*a* passes straight through the wire grid polarizer 108*a*. When the voltage of the reflection-type liquid crystal element 105*a* is thus not applied, the light that irradiates through the projection optical system 106*a* is in a light state.

And when the voltage of the reflection-type liquid crystal element 105*a* is applied, the S-wave that entered into the first region 51 of the reflection-type liquid crystal element 105*a* is emitted from the reflection-type liquid crystal element 105*a* as the S-wave without a change in the polarization direction, even if the S-wave travels back and forth passing through the liquid crystal layer, and enters the polarizing beam splitter 103*a* once again. The S-wave that entered this polarizing beam splitter 103*a* changes in angle by 90 degrees (beam traveling direction) by reflection at the wire grid polarizer 108*a*, and returns to the light source 101*a* side. When the voltage of the reflection-type liquid crystal element 105*a* is thus applied, the light that irradiates through the projection optical system 106*a* is in a dark state.

On the other hand, when the voltage of the reflection-type liquid crystal element 105*a* is not applied, the P-wave that entered into the second region 52 of the reflection-type liquid crystal element 105*a* passes through the liquid crystal layer, causing the polarization direction to rotate by 90 degrees, and forms the S-wave, which is emitted from the reflection-type liquid crystal element 105*a*, the S-wave is then reflected by the reflector 104, and enters the polarizing beam splitter 103*a* once again. The S-wave that entered this polarizing beam splitter 103*a* changes in angle by 90 degrees (beam traveling direction) by reflection at the wire grid polarizer 108*a*, and is emitted from the polarizing beam splitter 103*a* as irradiating light. When the voltage of the reflection-type liquid crystal element 105*a* is thus not applied, the light that irradiates through the projection optical system 106*a* is in a light state.

And when the voltage of the reflection-type liquid crystal element 105*a* is applied, the P-wave that entered into the second region 52 of the reflection-type liquid crystal element 105*a* is emitted from the reflection-type liquid crystal element 105*a* as the P-wave without a change in the polarization direction, even if the P-wave passes through the liquid crystal layer, the P-wave is then reflected by the reflector 104, and enters the polarizing beam splitter 103*a* once again. The P-wave that entered this polarizing beam splitter 103*a* passes straight through the wire grid polarizer 108*a*, and returns to the light source 101*a* side. When the voltage of the reflection-type liquid crystal element 105*a* is thus applied, the light that irradiates through the projection optical system 106*a* is in a dark state.

Figure 14A:
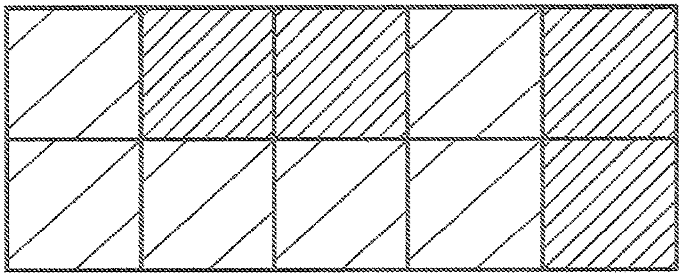
FIGS. 14A, 14B, 14C are drawings for describing the superimposition of the light distribution patterns.
Figure 14B:
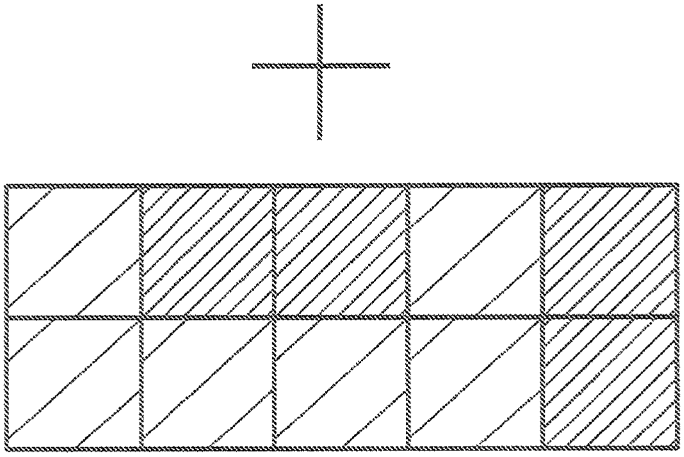
Figure 14C:
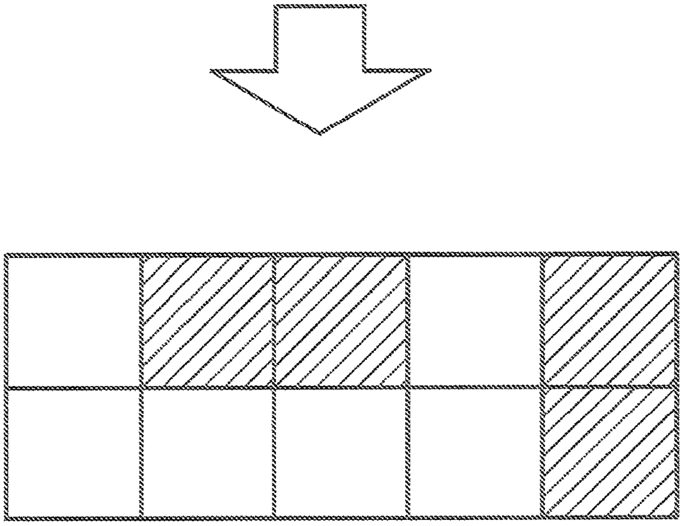

The emitted beams reflected in the first region 51 and the second region 52 of the reflection-type liquid crystal element 105*a* are combined in the polarizing beam splitter 103*a*. With the polarization direction of the emitted beams controlled per pixel (predetermined section) of the reflection-type liquid crystal element 105*a*, a preferred light distribution pattern is formed. For example, if the light distribution patterns of the emitted beams in the first region 51 and the second region 52 of the reflection-type liquid crystal element 105*a* are made exactly the same and superimposed in the same position, it is possible to achieve a vehicle lamp unit having a high light usage efficiency and a high light-dark contrast. FIGS. 14A-14C illustrates an example of the light distribution patterns (light-dark patterns) in this case. FIG. 14A illustrates an example of the light distribution pattern by the first region 51 of reflection-type liquid crystal element 105*a*, FIG. 14B illustrates an example of the light distribution pattern by the second region 52 of reflection-type liquid crystal element 105*a*, and FIG. 14C illustrates an example of the combined light distribution pattern.

Figure 15A:
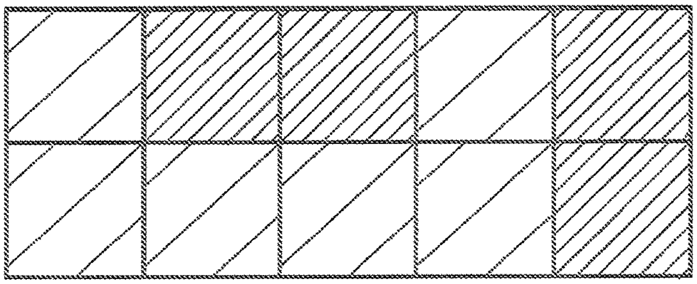
FIGS. 15A, 15B, 15C are drawings for describing the superimposition of the light distribution patterns.
Figure 15A:
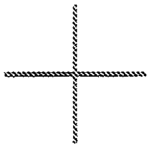
Figure 15B:
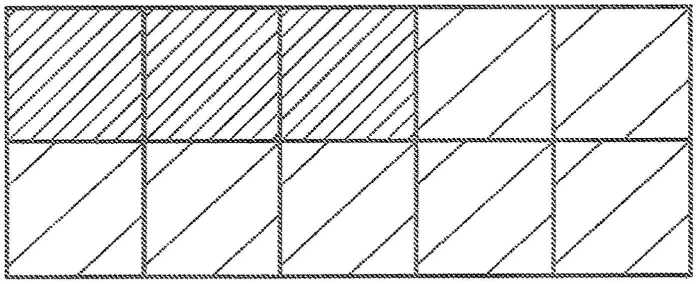
Figure 15B:
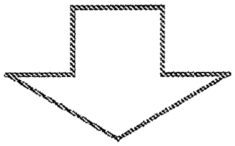
Figure 15C:
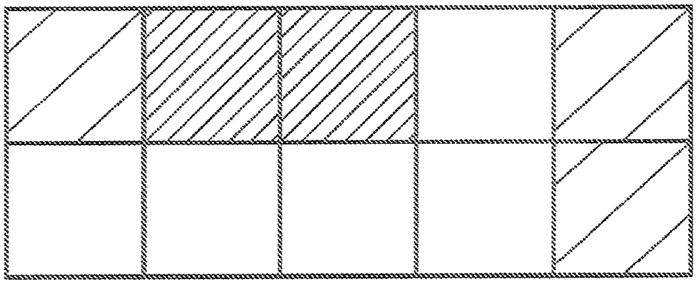

Further, if the light distribution patterns of the emitted beams in the first region 51 and the second region 52 of the reflection-type liquid crystal element 105*a* are made to differ and superimposed in the same position, or the light distribution patterns used are exactly the same and superimposed with the positions shifted, it is possible to achieve a vehicle lamp unit capable of controlling three types of brightness, including a brightest section in which the light from each distribution pattern is combined, an intermediate bright section having only the light from one pattern, and a darkest section not reached by either reflected light patterns. Examples of the light distribution patterns (the light-dark patterns) in this case are shown in FIGS. 15A-15C. FIG. 15A illustrates an example of the light distribution pattern by the first region 51 of reflection-type liquid crystal element 105*a*, FIG. 15B illustrates an example of the light distribution pattern by the second region 52 of reflection-type liquid crystal element 105*a*, and FIG. 15C illustrates an example of the combined light distribution pattern.

Embodiment 7

Figure 16:
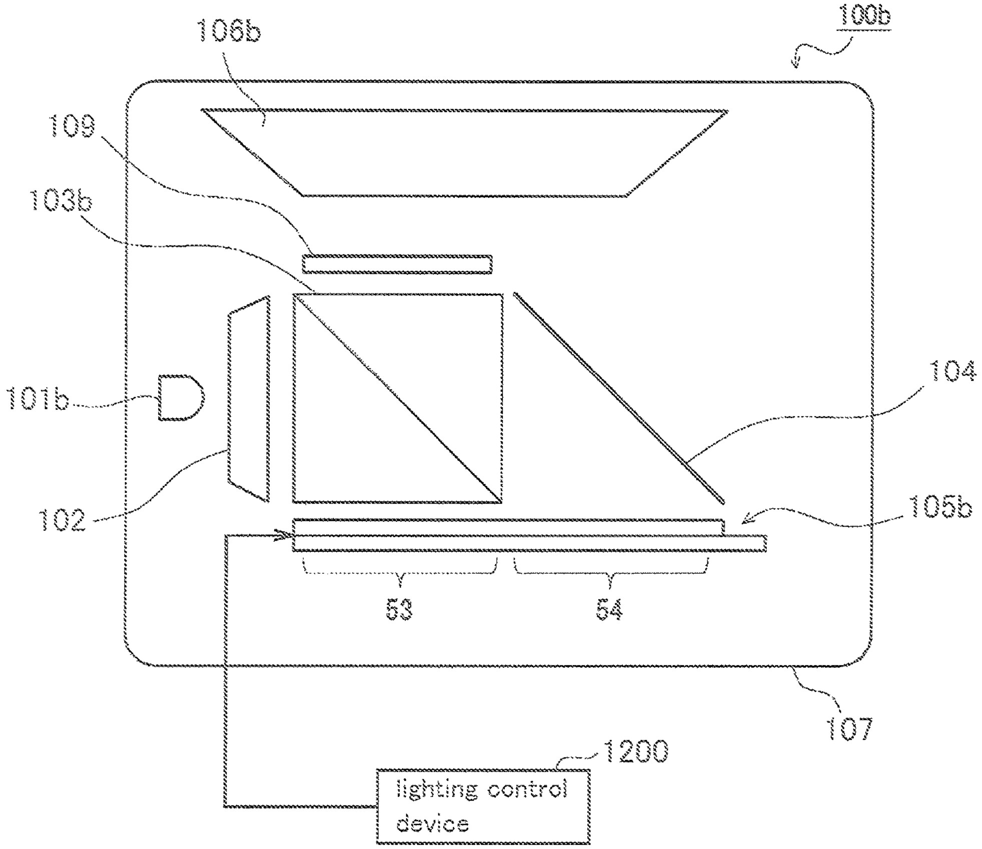
FIG. 16 is a schematic drawing for describing a vehicle lamp unit of embodiment 7.

FIG. 16 is a schematic drawing for describing a vehicle lamp unit of embodiment 7. A vehicle lamp unit 100*b* of embodiment 7 is configured to include a light source 101*b*, a parallel optical system 102, a polarizing beam splitter 103*b*, a reflector 104, a reflection-type liquid crystal element 105*b*, a projection optical system 106*b*, a fluorescent substance 109, and a lamp unit housing 107 that houses these. This vehicle lamp unit 100*b* is controlled by a lighting control device 1200, and forms a light distribution pattern in accordance with a position of a forward vehicle or the like that exists in front of the vehicle.

The light source 101*b* emits a light having a single wavelength, and is a light-emitting device (LED) that emits blue light, for example.

The parallel optical system 102 turns the light having a single wavelength emitted from the light source 101*b* into parallel light, and a convex lens may be used, for example. In this case, the light source 101*b* is disposed near a focal point of the convex lens, making it possible to produce parallel light.

The polarizing beam splitter 103*b* splits the light emitted from the parallel optical system 102 into a P-wave and a S-wave, which are two lights that differ in polarization direction, and emits the lights from a lower side surface (first surface) and a right side surface (second surface) in the drawing, respectively. Examples of the polarizing beam splitter 103*b* used include a beam splitter that uses a dielectric multilayer film corresponding to the wavelength range of the light source 101*b*. As such a polarizing beam splitter 103*b*, for example, there is a polarizing beam splitter manufactured by Sigmakoki Co., Ltd., or the like.

The reflector 104 is disposed facing the right side surface of the polarizing beam splitter 103*b*, bends the light emitted from this right side surface by substantially 90 degrees, and reflects the light.

The reflection-type liquid crystal element 105*b* includes a first region 53 into which the light emitted from the lower side surface of the polarizing beam splitter 103*b* enters, and a second region 54 into which the light that was emitted from the right side surface of the polarizing beam splitter 103*b* and reflected by the reflector 104 enters. In each of the first region 53 and the second region 54, the entered light is reflected without rotation of the polarization direction (first state) or reflected with rotation of the polarization direction (second state). The first state and the second state of the reflection-type liquid crystal element 105*b* can be switched in each predetermined section (pixel) in accordance with the size of voltage applied to the liquid crystal layer by the lighting control device 1200. Examples of the reflection-type liquid crystal element 105*b* used include a liquid crystal element comprising upper and lower substrates and a liquid crystal layer inserted therebetween, wherein the liquid crystal molecules of the liquid crystal layer are vertically uniaxially oriented between the upper substrate and the lower substrate. A reflective film made of aluminum is provided on an outer side (or an inner side) of a back substrate of the reflection-type liquid crystal element 105*b*.

The reason for using a vertical alignment type liquid crystal element as the reflection-type liquid crystal element 105*b* is that there is zero retardation when voltage is not applied to the liquid crystal layer and thus the entered polarized beam is reflected and emitted without any change (without rotation of the polarization direction), making it possible to darken the dark state of the illuminating light to the greatest extent. Further, when the voltage is applied to the liquid crystal layer, the entered polarized beam is reflected upon rotation by 90 degrees and then emitted, making it possible to produce a light state of the illuminating light. These two states can be switched based on the signal (voltage applied to the liquid crystal element) from the lighting control device 1200. While the polarized beam can be rotated by 90 degrees by matching the retardation of the reflection-type liquid crystal element 105*b*, which is a vertical alignment type, to one-fourth the wavelength, the value differs due to the wavelength of the incident light, that is, the value is wavelength dependent. In this embodiment, however, a light source that emits light having a single wavelength is used as the light source 101*b*, and therefore there is no need to take wavelength dependency into consideration.

A fluorescent substance 109 is disposed so that the light emitted from the upper side surface of the polarizing beam splitter 103*b* enters therein, and produces light (fluorescent light) which occurs upon excitation by the entered light having a single wavelength and has a wavelength that differs from the light having this single wavelength. Examples of the fluorescent substance 109 used include a fluorescent substance plate obtained by mixing a yttrium aluminum garnet (YAG) fluorescent substance and a scattered substance and then hardening the mixture, or a fluorescent substance obtained by coating a transparent substrate with a fluorescent substance. A portion of the components of the light (blue light) having a single wavelength, which was reflected by the reflection-type liquid crystal element 105*b* and passed through the polarizing beam splitter 103*b* once again, excites the fluorescent substance 109 and produces yellow light, and the remaining components of the blue light are emitted from the fluorescent substance 109 as is. At this time, the yellow light becomes scattered light from the fluorescent substance 109, the blue light similarly becomes scattered light by the scattered substance, and the colors of these lights are mixed to form a white scattered light, which is emitted from the fluorescent substance 109.

The projection optical system 106*b* expands the scattered light that passed through the fluorescent substance 109 so that the light forms a predetermined light distribution for a headlight, and projects the light in front of the vehicle, and a suitably designed lens is used therefor.

Figure 17:
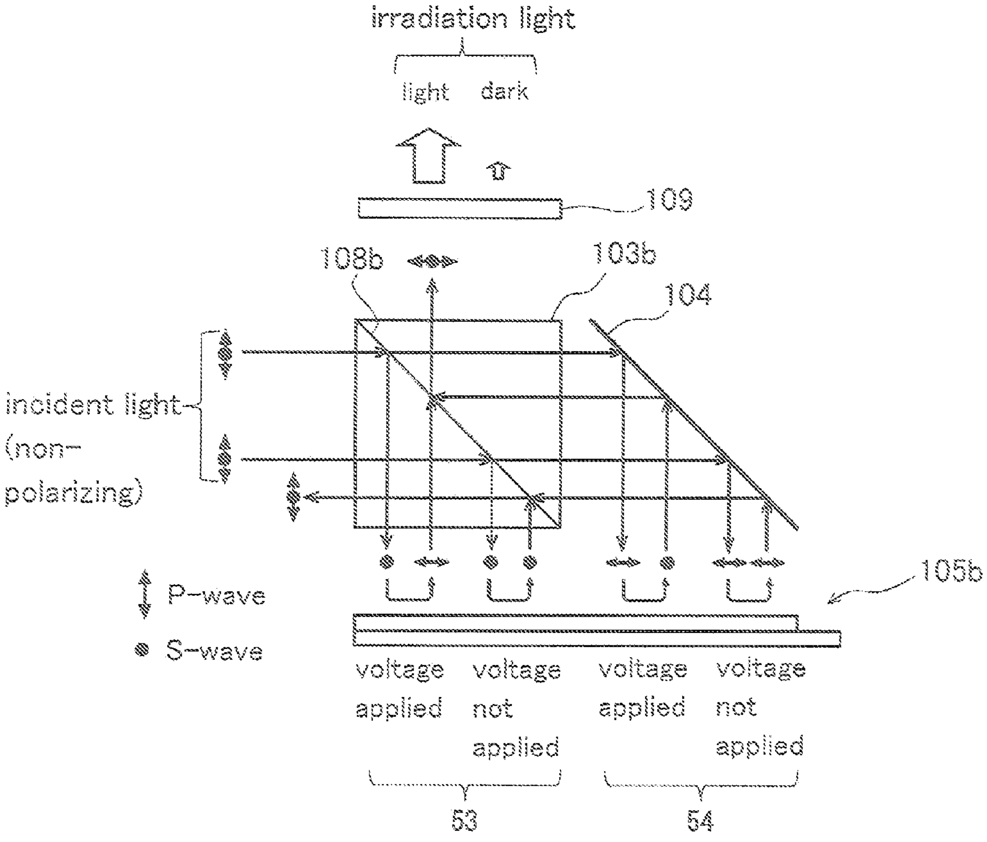
FIG. 17 is a drawing for describing the principle by which the contrast of the irradiating light of the vehicle lamp unit of embodiment 7 is switched.

FIG. 17 is a drawing for describing the principle by which the contrast of the irradiating light of the vehicle lamp unit of embodiment 7 is switched. Hence, among the components of the vehicle lamp unit 100*b*, FIG. 17 extracts and illustrates the polarizing beam splitter 103*b*, the reflection-type liquid crystal element 105*b* and the fluorescent substance 109, and describes the principle by which the contrast of the irradiating light is switched by these components.

The parallel light that enters the polarizing beam splitter 103*b* is non-polarizing, and therefore has both the P-wave and the S-wave components. At the dielectric multilayer film 108*b*, which is a polarized beam separating section of the polarizing beam splitter 103*b*, this parallel light is split into the P-wave that passes straight through the polarizing beam splitter 103*b* and is emitted from a right side surface of the polarizing beam splitter 103*b*, and the S-wave that changes in angle by 90 degrees (beam traveling direction) by reflection, is emitted from a lower side surface of the polarizing beam splitter 103*b*, and enters the reflection-type liquid crystal element 105*b*.

When the voltage of the reflection-type liquid crystal element 105*b* is not applied, the S-wave that entered into the first region 53 of the reflection-type liquid crystal element 105*b* is emitted from the reflection-type liquid crystal element 105*b* as the S-wave without a change in the polarization direction, even if the S-wave travels back and forth passing through the liquid crystal layer, and enters the polarizing beam splitter 103*b* once again. The S-wave that entered this polarizing beam splitter 103*b* changes in angle by 90 degrees (beam traveling direction) by reflection at the dielectric multilayer film 108*b*, and returns to the light source 101*b* side. When the voltage of the reflection-type liquid crystal element 105*b* is thus not applied, the light that irradiates through the projection optical system 106*b* is in a dark state.

And when the voltage of the reflection-type liquid crystal element 105*b* is applied, the S-wave that entered into the first region 53 of the reflection-type liquid crystal element 105*b* passes through the liquid crystal layer, causing the polarization direction to rotate by 90 degrees, and forms the P-wave, which is emitted from the reflection-type liquid crystal element 105*b* and enters the polarizing beam splitter 103*b* once again. The P-wave that entered this polarizing beam splitter 103*b* passes straight through the dielectric multilayer film 108*b*, and emits from the upper side surface of the polarizing beam splitter 103*b*. When the voltage of the reflection-type liquid crystal element 105*b* is thus applied, the light that irradiates through the projection optical system 106*b* is in a light state.

On the other hand, when the voltage of the reflection-type liquid crystal element 105*b* is not applied, the P-wave that entered into the second region 54 of the reflection-type liquid crystal element 105*b* is emitted from the reflection-type liquid crystal element 105*b* as the P-wave without a change in the polarization direction, even if the P-wave travels back and forth passing through the liquid crystal layer, the P-wave is then reflected by the reflector 104, and enters the polarizing beam splitter 103*b* once again. At the dielectric multilayer film 108*b*, which is a polarized beam separating section of the polarizing beam splitter, the P-wave that entered this polarizing beam splitter 103*b* passes straight through, and returns to the light source 101*b* side. When the voltage of the reflection-type liquid crystal element 105*b* is thus not applied, the light that irradiates through the projection optical system 106*b* is in a dark state.

And when the voltage of the reflection-type liquid crystal element 105*b* is applied, the P-wave that entered into the second region 54 of the reflection-type liquid crystal element 105*b* passes through the liquid crystal layer, causing the polarization direction to rotate by 90 degrees, and forms the S-wave, which is emitted from the reflection-type liquid crystal element 105*b*, the S-wave is then reflected by the reflector 104, and enters the polarizing beam splitter 103*b* once again. The S-wave that entered this polarizing beam splitter 103*b* changes in angle by 90 degrees (beam traveling direction) by reflection at the dielectric multilayer film 108*b*, and emits from the upper side surface of the polarizing beam splitter 103*b*. When the voltage of the reflection-type liquid crystal element 105*b* is thus applied, the light that irradiates through the projection optical system 106*b* is in a light state.

The emitted beams reflected in the first region 53 and the second region 54 of the reflection-type liquid crystal element 105*b* are combined in the polarizing beam splitter 103*b*. With the polarization direction of the emitted beams controlled per pixel (predetermined section) of the reflection-type liquid crystal element 105*b*, a preferred light distribution pattern is formed. For example, if the light distribution patterns of the emitted beams in the first region 53 and the second region 54 of the reflection-type liquid crystal element 105*b* are made exactly the same and superimposed in the same position, it is possible to achieve a vehicle lamp unit having a high light usage efficiency and a high light-dark contrast. (Refer to the description of FIGS. 14A, 14B, 14C stated above.)

Further, if the light distribution patterns of the emitted beams in the first region 53 and the second region 54 of the reflection-type liquid crystal element 105*b* are made to differ and superimposed in the same position, or the light distribution patterns used are exactly the same and superimposed with the positions shifted, it is possible to achieve a vehicle lamp unit capable of controlling three types of brightness, including a brightest section in which the light from each distribution pattern is combined, an intermediate bright section having only the light from one pattern, and a darkest section not reached by either reflected light patterns. (Refer to the description of FIGS. 15A, 15B, 15C stated above.)

According to each of the embodiments described above, it is possible to achieve a vehicle lamp unit and a vehicle headlamp system that have a high contrast ratio of light and dark light and are capable of sufficiently cutting off the illumination light. Further, the two lights that are emitted from the polarizing beam splitter and have different polarization directions can be utilized for illumination, making it possible to further increase light usage efficiency. Furthermore, the two lights with different polarization directions can be controlled by the use of one reflection-type liquid crystal element, making it possible to achieve cost reduction advantages as well.

Note that this invention is not limited to the subject matter of the foregoing embodiments, and can be implemented by being variously modified within the scope of the gist of the present invention. For example, while the reflection-type liquid crystal element performs control using only binary voltage, voltage applied and voltage not applied, in each of the embodiments described above, a reflectivity of the incident light may be continually changed by setting the applied voltage more minutely. As a result, it is possible to achieve a vehicle lamp unit and vehicle headlamp system in which the brightness is freely set for each irradiation region. Further, while light control means made of one reflection-type liquid crystal element is used to control the light in the first region and the second region in embodiment 6 and 7 described above, light control means made of two reflection-type liquid crystal elements may be used, with one controlling the light corresponding to the first region and the other controlling the light corresponding to the second region.

What is claimed is:

1. A vehicle headlamp unit for selectively irradiating light in front of a vehicle comprising:

a light source;

a parallel optical system that turns light from the light source into parallel light;

a polarizing beam splitter that splits light emitted from the parallel optical system into two polarized beams having polarization directions orthogonal to each other;

a first reflection-type liquid crystal element configured to switch, when a signal is applied to the first liquid crystal element, between a first state in which the light emitted from a first surface of the polarizing beam splitter is reflected without rotation of the polarization direction, and a second state in which the light is reflected with rotation of the polarization direction, in each predetermined section;

a second reflection-type liquid crystal element configured to switch, when a signal is applied to the second liquid crystal element, between a first state in which the light emitted from a second surface of the polarizing beam splitter is reflected without rotation of the polarization direction, and a second state in which the light is reflected with rotation of the polarization direction, in each predetermined section, wherein the polarizing beam splitter, the first reflection-type liquid crystal element, and the second reflection-type liquid crystal element are configured such that light reflected from the first reflection-type liquid crystal element and the second reflection-type liquid crystal element are combined in the polarizing beam splitter and emitted as irradiation light from the polarizing beam splitter; and a projection optical system that projects light, which has been reflected by the first and the second reflection-type liquid crystal element respectively and passed through the polarizing beam splitter once again, in front of the vehicle.

2. A vehicle headlamp unit for selectively irradiating light in front of a vehicle comprising:

a light source that emits light of a first wavelength which is a single wavelength;

a parallel optical system that turns light from the light source into parallel light;

a polarizing beam splitter that splits light emitted from the parallel optical system into two polarized beams having polarization directions orthogonal to each other;

a first reflection-type liquid crystal element configured to switch, when a signal is applied to the first liquid crystal element, between a first state in which the light emitted from a first surface of the polarizing beam splitter is reflected without rotation of the polarization direction, and a second state in which the light is reflected with rotation of the polarization direction, in each predetermined section;

a second reflection-type liquid crystal element configured to switch, when a signal is applied to the second liquid crystal element, between a first state in which the light emitted from a second surface of the polarizing beam splitter is reflected without rotation of the polarization direction, and a second state in which the light is reflected with rotation of the polarization direction, in each predetermined section, wherein the polarizing beam splitter, the first reflection-type liquid crystal element, and the second reflection-type liquid crystal element are configured such that light reflected from the first reflection-type liquid crystal element and the second reflection-type liquid crystal element are combined in the polarizing beam splitter and emitted as irradiation light from the polarizing beam splitter;

a fluorescent substance that emits fluorescent light that is excited by light that was reflected by the first and the second reflection-type liquid crystal element respectively and passed through the polarizing beam splitter once again, and has a second wavelength that is different from the first wavelength; and a projection optical system that projects mixed-color light of the fluorescent light from the fluorescent substance as well as light that has passed through the fluorescent substance, in front of the vehicle.

3. The vehicle headlamp unit according to claim 1, wherein:

the light-dark patterns of the reflected light from the first reflection-type liquid crystal element and the second reflection-type liquid crystal element are the same, and these same light-dark patterns are combined in the polarizing beam splitter so as to overlap each other.

4. The vehicle headlamp unit according to claim 2, wherein:

the light-dark patterns of the reflected light from the first reflection-type liquid crystal element and the second reflection-type liquid crystal element are the same, and these same light-dark patterns are combined in the polarizing beam splitter so as to overlap each other.

5. The vehicle headlamp unit according to claim 1, wherein:

the light-dark patterns of the reflected light from the first reflection-type liquid crystal element and the second reflection-type liquid crystal element are different, and these different light-dark patterns are combined in the polarizing beam splitter so as to overlap each other.

6. The vehicle headlamp unit according to claim 2, wherein:

the light-dark patterns of the reflected light from the first reflection-type liquid crystal element and the second reflection-type liquid crystal element are different, and these different light-dark patterns are combined in the polarizing beam splitter so as to overlap each other.

7. The vehicle headlamp unit according to claim 1, further comprising:

a lighting control device configured to apply the signal to sections of the first liquid crystal element and the second liquid crystal element.

8. The vehicle headlamp unit according to claim 2, further comprising:

a lighting control device configured to apply the signal to sections of the first liquid crystal element and the second liquid crystal element.

* * * * *